(12) United States Patent
Kwak et al.

(10) Patent No.: US 10,735,074 B2
(45) Date of Patent: *Aug. 4, 2020

(54) METHOD AND APPARATUS FOR CHANNEL STATUS INFORMATION FEEDBACK IN MOBILE COMMUNICATION SYSTEM

(71) Applicant: Samsung Electronics Co., Ltd., Suwon-si, Gyeonggi-do (KR)

(72) Inventors: Youngwoo Kwak, Suwon-si (KR); Jinyoung Oh, Seoul (KR); Hoondong Noh, Suwon-si (KR); Taehan Bae, Seoul (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,522

(22) Filed: Mar. 11, 2019

(65) Prior Publication Data
US 2019/0207664 A1    Jul. 4, 2019

Related U.S. Application Data

(63) Continuation of application No. 15/428,703, filed on Feb. 9, 2017, now Pat. No. 10,230,441.
(Continued)

(51) Int. Cl.
*H04B 7/06* (2006.01)
*H04L 5/00* (2006.01)
*H04B 7/0456* (2017.01)

(52) U.S. Cl.
CPC .......... *H04B 7/0639* (2013.01); *H04B 7/0478* (2013.01); *H04B 7/065* (2013.01);
(Continued)

(58) Field of Classification Search
CPC ... H04L 5/0023; H04L 5/0051; H04L 5/0057; H04L 5/0094; H04B 7/00478; H04B 7/0632; H04B 7/0039; H04B 7/065
See application file for complete search history.

(56) References Cited

U.S. PATENT DOCUMENTS 9,002,345 B2    4/2015  Lee et al.
9,253,791 B2    2/2016  Ihm et al.
(Continued)

FOREIGN PATENT DOCUMENTS

KR     10-1507865 B1    4/2015
WO     2013-085150 A1   6/2013

OTHER PUBLICATIONS

Samsung, Handling collision between nonPrecoded type and beamformed type CSI reports', R1-160534, 3GPP TSG RAN WG1 Meeting #84, St. Julian's, Malta, Feb. 5, 2016 (http://www.3gpp.org/ftp/tsg_ran/WG1_RL1/TSGR1_84/Docs/).

*Primary Examiner* — Gary Mui
(74) *Attorney, Agent, or Firm* — Jefferson IP Law, LLP

(57) ABSTRACT

A communication method and a system for converging a 5th-generation (5G) communication system for supporting higher data rates beyond a 4th-generation (4G) system with a technology for internet of things (IoT) are provided. The present disclosure may be applied to intelligent services based on the 5G communication technology and the IoT-related technology, such as smart home, smart building, smart city, smart car, connected car, health care, digital education, smart retail, security and safety services. A method and an apparatus for transmitting cell status information (CSI) in a mobile communication system are provided. The method includes receiving configuration information for a plurality of channel status information reference signals (CSI-RSs), generating feedback information by measuring at least one of the CSI-RSs based on priority information, and transmitting the feedback information. The priority information is associated with a non-precoded CSI-RS, a cell-specific beamformed CSI-RS and a user equipment (UE)-specific beamformed CSI-RS.

14 Claims, 14 Drawing Sheets

Related U.S. Application Data

(60) Provisional application No. 62/334,642, filed on May 11, 2016, provisional application No. 62/294,487, filed on Feb. 12, 2016.

(52) U.S. Cl.
CPC ......... *H04B 7/0632* (2013.01); *H04L 5/0023* (2013.01); *H04L 5/0051* (2013.01); *H04L 5/0057* (2013.01); *H04L 5/0094* (2013.01); *H04B 7/063* (2013.01)

(56) References Cited

U.S. PATENT DOCUMENTS

| | | |
|---|---|---|
| 2011/0242982 A1 | 10/2011 | Lunttila et al. |
| 2012/0140649 A1 | 6/2012 | Choudhury et al. |
| 2012/0201154 A1 | 8/2012 | Chandrasekhar et al. |
| 2012/0201207 A1 | 8/2012 | Liu et al. |
| 2013/0114455 A1 | 5/2013 | Yoo et al. |
| 2013/0121299 A1 | 5/2013 | Kim et al. |
| 2013/0148613 A1 | 6/2013 | Han et al. |
| 2014/0036664 A1 | 2/2014 | Han et al. |
| 2014/0341065 A1 | 11/2014 | Liao et al. |
| 2015/0023280 A1 | 1/2015 | Kim et al. |
| 2016/0295573 A1 | 10/2016 | Lee |
| 2017/0338877 A1 | 11/2017 | Yum et al. |
| 2018/0097603 A1 | 4/2018 | Lee et al. |
| 2018/0102822 A1 | 4/2018 | Noh et al. |

METHOD AND APPARATUS FOR CHANNEL STATUS INFORMATION FEEDBACK IN MOBILE COMMUNICATION SYSTEM

CROSS-REFERENCE TO RELATED APPLICATION(S)

This application is a continuation application of prior application Ser. No. 15/428,703, filed on Feb. 9, 2017, which will issue a U.S. Pat. No. 10,230,441 on Mar. 12, 2019 and was based on and claims the benefit under 35 U.S.C. § 119(e) of a U.S. provisional patent application filed on Feb. 12, 2016 in the U.S. Patent and Trademark Office and assigned Ser. No. 62/294,487, and of a U.S. provisional patent application filed on May 11, 2016 in the U.S. Patent and Trademark Office and assigned Ser. No. 62/334,642, the entire disclosure of each of which is hereby incorporated by reference.

TECHNICAL FIELD

The present disclosure relates to a method and an apparatus for reporting a channel status by using a channel status information reference signal (CSI-RS) in a mobile communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

MIMO systems may be classified into a closed-loop MIMO system and an open-loop MIMO system, depending on whether precoding matrix indicator (PMI) information on a receiver is used in forming a transmission beam pattern.

In case of the closed-loop MIMO system, an evolved node B (eNB) that receives a PMI feedback from a user equipment (UE) is specified to communicate with the UE by using appropriate transmission/reception precoding, based on received information. Contrary to the closed-loop MIMO system, in case of the open-loop MIMO system, a receiver does not deliver PMI information to a transmitter. Instead, the receiver of the open-loop MIMO system finds a supportable transmission rate by assuming precoding defined in advance by the method specified in the standard or higher signaling, as precoding to be assumed as to a time and frequency space when generating channel quality indicator (CQI) according to time and frequency resources, and delivers this to the transmitter through the CQI.

In general, it is known that the closed-loop MIMO may adaptively utilize channel information and thus has greater system performance in comparison with the open-loop MIMO. The reason is that while the closed-loop MIMO has a process of selecting the precoding preferred by the UE and notifying it to the eNB, the open-loop MIMO has no such process and thereby has difficulty in applying the precoding preferred by the UE whenever the eNB transmits a signal to the UE.

However, transmission/reception of signals through the closed-loop MIMO requires an additional overhead, such as transmission of PMI from the UE to the eNB. In addition, in a situation where a moving speed of a UE is very fast or a channel is suddenly changed, a beam pattern of an interference signal changes rapidly with time, and a performance loss due to a change of the interference signal may occur. On the other hand, the open-loop MIMO system has some advantages, such as small effects of dynamic interference and small feedback overhead for PMI even though the performance efficiency of the system itself is lower than that of the closed-loop MIMO system. A semi closed-loop MIMO may be considered to exploit the advantages of and to compensate the disadvantages of the open-loop MIMO and the closed-loop MIMO. In the semi closed-loop MIMO, the UE reports, to the eNB, part of PMI information other than the entire PMI information, and the eNB circulates a non-reported PMI part in the corresponding part of PMI information and transmits data to the UE.

Meanwhile, in the closed-loop MIMO or the semi closed-loop MIMO in which the UE provides feedback information to the eNB, the amount of feedback information to be transmitted on limited resources increases because of carrier aggregation (CA) or the like, thus resulting in a signal overhead issue.

Therefore, a need exists for a method and an apparatus for reporting a channel status by using a channel status information reference signal (CSI-RS) in a mobile communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for giving priorities and dropping information having a lower priority in channel status reporting.

Another aspect of the present disclosure is to provide a method and an apparatus for transmitting cell status information (CSI) in a mobile communication system.

In accordance with an aspect of the present disclosure, the method of transmitting CSI by a user equipment (UE) comprises receiving configuration information for a plurality of channel status information reference signals (CSI-RSs), generating feedback information by measuring at least one of the CSI-RSs based on priority information, and transmitting the feedback information. The priority information is associated with a non-precoded CSI-RS, a cell-specific beamformed CSI-RS and a UE-specific beamformed CSI-RS.

In accordance with another aspect of the present disclosure, the apparatus of a user equipment (UE) for transmitting CSI comprises a communication unit configured to transmit and receive signals, and at least one processor configured to receive configuration information for a plurality of CSI-RSs, generate feedback information by measuring at least one of the CSI-RSs based on priority information, and transmit the feedback information. The priority information is associated with a non-precoded CSI-RS, a cell-specific beamformed CSI-RS and a UE-specific beamformed CSI-RS.

According to various embodiments of the present disclosure, the signal overhead problem can be solved because more important information is transmitted preferentially in aperiodic channel status reporting and periodic channel status reporting.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
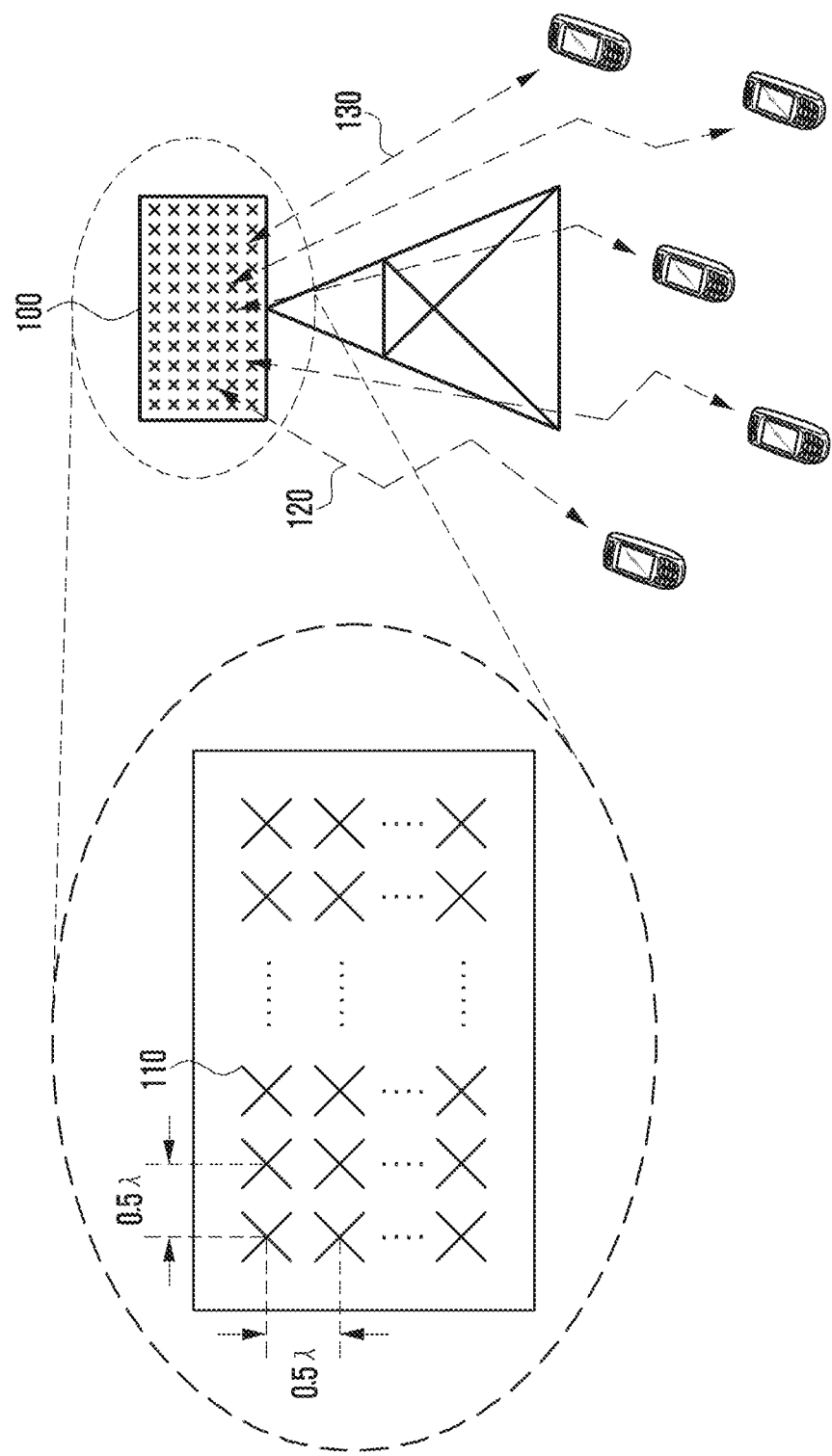
FIG. 1 is a diagram illustrating a full dimension multiple input multiple output (FD-MIMO) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In describing the embodiments, technologies which are well known in the art to which the present disclosure belongs and which are not directly related to the present disclosure will not be described. This is to avoid obscuring the subject matter of the present disclosure by omitting the unnecessary description.

For the same reason, some elements are exaggerated, omitted or schematically shown in the accompanying drawings. In addition, the size of each element does not entirely reflect the actual size. In the drawings, the same or corresponding elements are denoted by the same reference numerals.

The advantages and features of the present disclosure and the manner of achieving them will become apparent with reference to the embodiments described below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

In the following description of the present disclosure, a detailed description of known functions and configurations incorporated herein will be omitted when it may make the subject matter of the present disclosure unclear. The following terms are defined based on the functions of the present disclosure, and this may be changed according to the intention of the user, the operator, or the like. Therefore, the definition should be based on the contents throughout this specification.

Hereinafter, a long term evolution (LTE) system and an LTE-advanced (LTE-A) system are exemplified in this specification, but the present disclosure may be applied, without adding or subtracting, to any other communication system that uses a licensed band and an unlicensed band.

The present disclosure relates to a wireless mobile communication system and, more particularly, to a method for performing a channel status measurement report by using a reference signal in a wireless mobile communication system to which a multiple access scheme using a multi-carrier, such as orthogonal frequency division multiple access (OFDMA) is applied.

The current mobile communication system has evolved into a high-speed, high-quality wireless packet data communication system so as to provide a data service and a multimedia service, apart from initially providing a voice-oriented service. For this purpose, several standardization groups, such as $3^{rd}$ generation partnership project (3GPP), 3GPP2, and Institute of Electrical and Electronics Engineers (IEEE) have studied the third-generation evolved mobile communication system standard that adopts a multiple access scheme using a multi-carrier. Recently, a variety of mobile communication standards, such as LTE of 3GPP, ultra mobile broadband (UMB) of 3GPP2, and 802.16m of IEEE have been developed to support a high-speed, high-quality wireless packet data transmission service based on a multiple access scheme using a multi-carrier.

The existing third-generation evolved mobile communication systems, such as LTE, UMB, and 802.16m are based on a multi-carrier multiple access scheme and characterized by applying multiple input multiple output (MIMO, multiple antenna) and using various techniques, such as beam-forming, adaptive modulation and coding (AMC), and channel sensitive scheduling so as to improve transmission efficiency. These techniques improve transmission efficiency and system capacity performance by concentrating transmission power of several antennas or adjusting transmission data traffic, depending on a channel quality or the like, and selectively transmitting data to a user having a better channel quality. Because most of these techniques operate based on channel status information between an evolved Node B (eNB), or a base station (BS) and a user equipment (UE), or a mobile station (MS), the eNB or the UE needs to measure a channel status between the eNB and the UE by using a channel status information reference signal (CSI-RS). The above-mentioned eNB refers to a downlink transmitting and uplink receiving apparatus located at a certain place, and one eNB performs transmission and reception as to a plurality of cells. In one mobile communication system, lots of eNBs are geographically distributed, and each eNB performs transmission and reception with regard to a plurality of cells.

The existing third-generation and fourth-generation mobile communication systems, such as LTE and LTE-A utilize a MIMO technique for transmitting data using a plurality of transmitting/receiving antennas in order to increase a data transfer rate and a system capacity. The MIMO technique spatially separates and transmits a plurality of information streams by using transmitting/receiving antennas. This is referred to as spatial multiplexing. Normally it depends on the number of antennas of a transmitter and a receiver whether spatial multiplexing may be applied to information streams. In addition, the ability to apply spatial multiplexing to information streams is called the rank of transmission. The MIMO technique supported by standards up to the LTE/LTE-A Release 11 supports spatial multiplexing as to eight transmitting antennas and eight receiving antennas and thus maximally supports eight ranks. In contrast, an FD-MIMO system to which techniques proposed herein are applied is evolved from the existing LTE/LTE-A MIMO technique and uses thirty-two transmitting antennas or more.

The FD-MIMO system refers to a wireless communication system that transmits data by utilizing several tens of transmitting antennas or more.

FIG. 1 is a diagram illustrating an FD-MIMO system according to an embodiment of the present disclosure.

Referring to FIG. 1, an eNB transmitting apparatus 100 (hereinafter, referred to as eNB) transmits a radio signal by using dozens of transmitting antennas or more. The respective transmitting antennas 110 are arranged to maintain the minimum distance from each other. One example of the minimum distance is the half of a wavelength of a transmitting radio signal. Generally, when a distance corresponding to the half of a wavelength of a radio signal is maintained between transmitting antennas, signals transmitted from the respective transmitting antennas are affected by radio channels having a low correlation. If the bandwidth of a transmitting radio signal is 2 GHz, this distance is 7.5 cm. If the bandwidth is higher than 2 GHz, this distance becomes shorter.

In FIG. 1, dozens of transmitting antennas or more arranged in the eNB 100 are used to transmit a signal 120 or 130 to one or more UEs. For simultaneous transmission to the UEs, appropriate precoding is applied to the transmitting antennas. In this case, single UE may receive one or more information streams. Normally, the number of information streams that a single UE may receive is determined depending on the number of receiving antennas in the UE and a channel condition.

In order to effectively implement the FD-MIMO system, the UE should accurately measure a channel condition and the size of interference and, using them, transmit effective channel status information to the eNB. The eNB that receives the channel status information determines specific UE, a specific data transfer rate, specific precoding, and the like in connection with transmission of downlink. In case of the FD-MIMO system that has many transmitting antennas, an uplink overhead issue having to transmit a lot of control information through uplink may be caused when the channel status information transmission/reception method of the LTE/LTE-A system according to the related art is applied.

In mobile communication systems, resources of time, frequency and power are limited. Therefore, if more resources are allocated to a reference signal, resources allocable to data traffic channel transmission are reduced and thus the absolute amount of transmitting data may be reduced. In this case, although the performance of channel measurement and estimation may be improved, the overall system capacity performance may be lowered because of a reduction in the absolute amount of transmitting data. Therefore, in order to derive the optimum performance in view of the total system capacity, a proper allocation between a resource for a reference signal and a resource for a traffic channel transmission signal is required.

Figure 2:
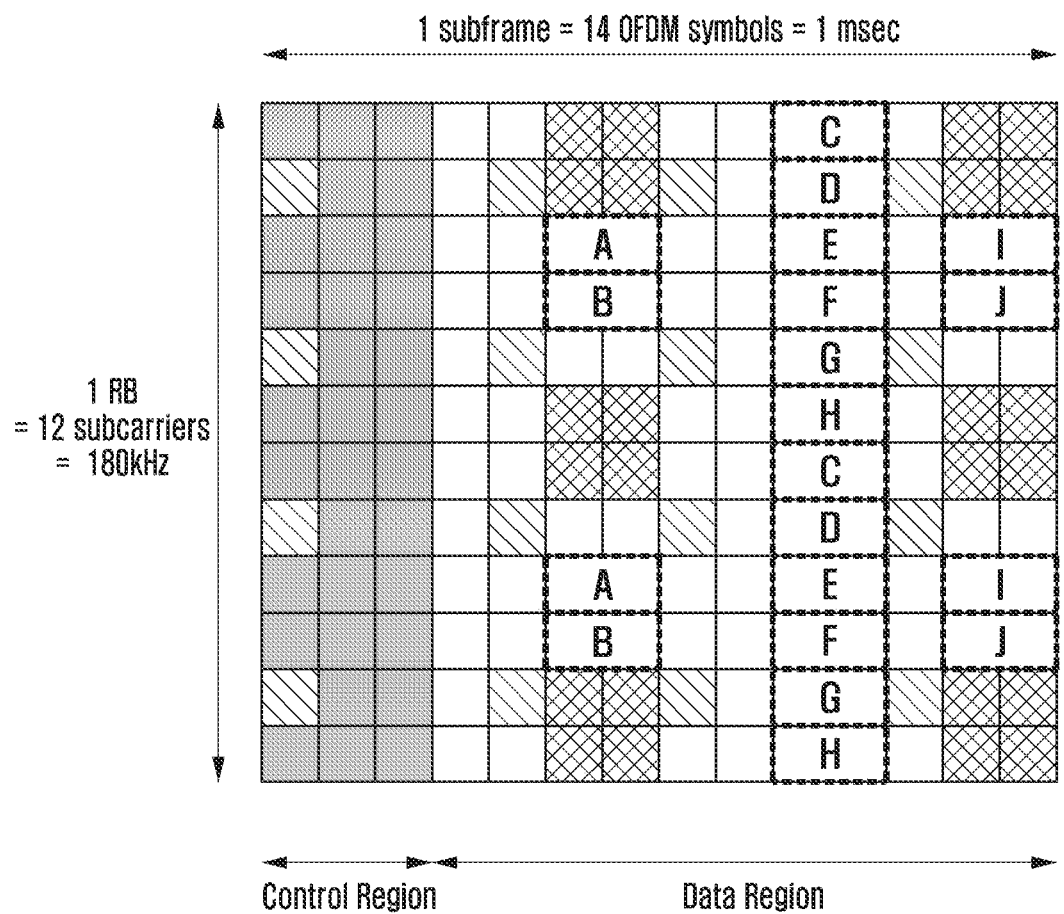
FIG. 2 is a diagram illustrating a radio resource configuration of a long term evolution (LTE) system according to an embodiment of the present disclosure.
Figure 2:
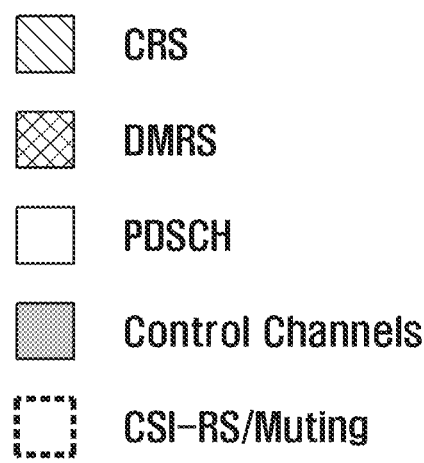

FIG. 2 is a diagram illustrating a radio resource configuration of an LTE system according to an embodiment of the present disclosure.

Referring to FIG. 2, the radio resource formed of one subframe and one resource block (RB), which is the minimum unit for scheduling on downlink in the LTE/LTE-A system.

The radio resource shown is formed of a single subframe on the time axis and a single RB on the frequency axis. This radio resource is also formed of twelve subcarriers in the frequency domain and fourteen OFDM symbols in the time domain, thus having total 168 unique frequency and time positions. In the LTE/LTE-A, each of the unique frequency and time positions is referred to as a resource element (RE).

In the radio resource shown in FIG. 2, a plurality of different kinds of signals may be transmitted as follows.

1. Cell-specific reference signal (CRS): This is a reference signal transmitted periodically for all UEs that belong to a single cell. This signal may be used in common by a plurality of the UEs.

2. Demodulation reference signal (DMRS): This is a reference signal transmitted for specific UE and used only in case of transmitting data to the UE. DMRS may be formed of total eight DMRS ports. In the LTE/LTE-A, ports 7 to 14 correspond to DMRS ports, each of which maintains orthogonality by using code division multiplexing (CDM) or frequency division multiplexing (FDM) so as not to cause interference.

3. Physical downlink shared channel (PDSCH): This is a data channel transmitted on downlink and used by the eNB to transmit traffic to the UE. This is transmitted using RE through which no reference signal is transmitted in a data region shown in FIG. 2.

4. Channel status information reference signal (CSI-RS): This is a reference signal transmitted for the UEs in a single cell and used for measuring a channel status. A plurality of CSI-RSs may be transmitted in a single cell.

5. Other Control Channel (physical hybrid automatic repeat request (HARQ) indicator channel (PHICH), physical control format indicator channel (PCFICH), physical downlink control channel (PDCCH)): This is used for offering control information required for the UE to receive PDSCH or used for transmitting acknowledgement (ACK)/negative ACK (NACK) for operating HARQ with regard to uplink data transmission.

In addition to the above signals, the LTE-A system may configure muting such that CSI-RS transmitted by any other eNB may be received at the UEs in a corresponding cell without interference. This muting may be applied to a location allowing CSI-RS transmission, and normally the UE receives a traffic signal by jumping over such a radio resource. In the LTE-A system, muting may be also referred to as zero-power CSI-RS since muting is applied to the location of CSI-RS without transmission of power.

In FIG. 2, CSI-RS may be transmitted using some of locations denoted as A, B, C, D, E, F, G, H, I and J, depending on the number of antennas that transmit CSI-RS. Similarly, muting may be applied to some of locations denoted as A, B, C, D, E, F, G, H, I and J. Particularly, CSI-RS may be transmitted using two, four and eight REs, depending on the number of antenna ports for transmission. If the number of antenna ports is two, CSI-RS is transmitted using the half of a specific pattern in FIG. 2. In addition, CSI-RS is transmitted using the entire specific pattern in case of four antenna ports and using two patterns in case of eight antenna ports. On the contrary, muting is always formed in the unit of a single pattern. Namely, muting may be applied to a plurality of patterns and, in case of being not overlapped with CSI-RS in location, cannot be applied to only a part of a single pattern. However, only in case of being overlapped with CSI-RS, muting may be applied to a part of a single pattern. When CSI-RS is transmitted for two antenna ports, a signal of each antenna port is transmitted at two REs connected on the time axis, and these signals of antenna ports are distinguished from each other by means of an orthogonal code. Additionally, when CSI-RS is transmitted for four antenna ports, two REs are further used in the same manner. This is the same for CSI-RS transmission for eight antenna ports.

In the cellular system, it is required to transmit a reference signal so as to measure a downlink channel status. In case of the 3GPP LTE-A system, the UE measures the status of a channel with the eNB by using CRS or CSI-RS transmitted by the eNB. Basically, a channel status should consider some factors including the amount of interference on downlink. The amount of downlink interference includes an interference signal and a thermal noise, caused by an antenna of neighboring eNB, and is important for the UE to determine a downlink channel status. For example, when the eNB having a single transmitting antenna transmits a signal to the UE having a single receiving antenna, the UE should determine, using a reference signal received from the eNB, an energy per symbol (Es) capable of being received on downlink and the amount of interference (Io) to be received simultaneously in a section receiving the symbol, and then determine Es/Io. The determined Es/Io is converted into a data transfer rate or a corresponding value and then notified to the eNB in the form of channel quality indicator (CQI). Therefore, the eNB may determine a data transfer rate to be used for downlink transmission to the UE.

In case of the LTE-A system, the UE offers a feedback of information about a downlink channel status to the eNB so as to be utilized in downlink scheduling of the eNB. Namely, the UE measures a reference signal transmitted on downlink by the eNB and then feeds back extracted information to the eNB in a form defined in the LTE/LTE-A standard. In the LTE/LTE-A, feedback information of the UE is mainly three types as follows.

Rank indicator (RI): This refers to the number of spatial layers which may be received by the UE in a current channel status.

PMI: This refers to an indicator regarding a precoding matrix which is preferred by the UE in a current channel status.

CQI: This refers to the maximum data rate which may be received by the UE in a current channel status. CQI may be replaced with SINR, the maximum error correction code rate and modulation scheme, data efficiency per frequency, and the like.

The above-discussed RI, PMI and CQI have meanings in connection with each other. For example, a precoding matrix supported in the LTE/LTE-A is defined differently according to ranks. Therefore, a PMI value in case an RI value is 1 is interpreted differently from a PMI value in case an RI value is 2 even though both values are the same. Additionally, when determining CQI, the UE assumes that the PMI value notified to the eNB by the UE is applied to the eNB. Namely, when the UE notifies RI_X, PMI_Y and CQI_Z to the eNB, this means that the UE may receive a data rate corresponding to CQI_Z if rank and precoding are RI_X and PMI_Y, respectively. Therefore, when calculating CQI, the UE assumes which transmission type to be used for the eNB such that optimized performance may be obtained when actual transmission is performed in such a transmission type.

In the LTE/LTE-A, a periodic feedback of the UE is set to one of the following four feedback modes or reporting modes, depending on contained information:

Reporting mode 1-0: RI, wideband CQI (wCQI)
Reporting mode 1-1: RI, wCQI, PMI
Reporting mode 2-0: RI, wCQI, subband CQI (sCQI)
Reporting mode 2-1: RI, wCQI, sCQI, PMI A feedback timing of information as to each of the above four feedback modes is determined by values, such as $N_{pd}$, $N_{OFFSET,CQI}$, $M_{RI}$, and $N_{OFFSET,RI}$ delivered as higher layer signals. In the feedback mode 1-0, a transmission period of wCQI is $N_{pd}$, and a feedback timing is determined with a subframe offset value of $N_{OFFSET,CQI}$. In addition, a transmission period of RI is $N_{pd} \cdot M_{RI}$, and an offset is $N_{OFFSET,CQI} + N_{OFFSET,RI}$.

Figure 3:
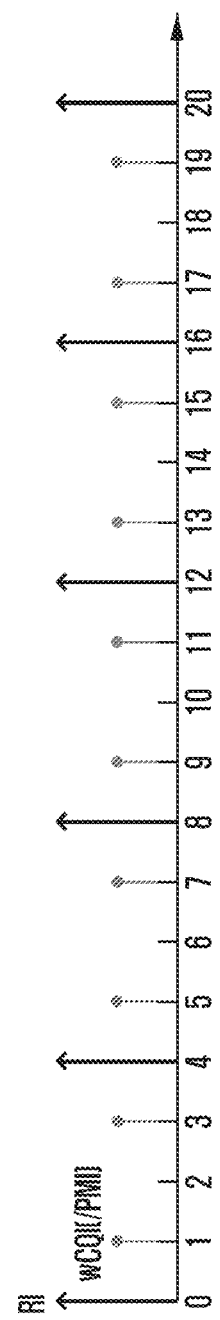
FIG. 3 is a diagram illustrating channel status information feedback timing of a user equipment (UE) according to an embodiment of the present disclosure.

FIG. 3 is a diagram illustrating channel status information feedback timing according to an embodiment of the present disclosure. In FIG. 3, each timing indicates a subframe index.

Referring to FIG. 3, the diagram illustrates channel status information feedback timings of RI and wCQI in case of $N_{pd}=2$, $M_{RI}=2$, $N_{OFFSET,CQI}=1$, and $N_{OFFSET,RI}=-1$. The feedback mode 1-1 has the same feedback timing as the mode 1-0, but has a difference that wCQI and PMI are transmitted together at the wCQI transmission timing.

In the feedback mode 2-0, a feedback period for sCQI is $N_{pd}$, and an offset value is $N_{OFFSET,CQI}$. In addition, a feedback period for wCQI is $H \cdot N_{pd}$, and an offset value is $N_{OFFSET,CQI}$ as the offset value of sCQI. When defined as $H=J \cdot K+1$, K is delivered as a higher layer signal, and J is a value determined depending on system bandwidth.

For example, the value of J with regard to the 10 MHz system is defined as 3. In the end, wCQI is transmitted replacing this once every H transmissions of sCQI. In addition, a period of RI is $M_{RI} \cdot H \cdot N_{pd}$, and an offset is $N_{OFFSET,CQI} + N_{OFFSET,RI}$.

Figure 4:
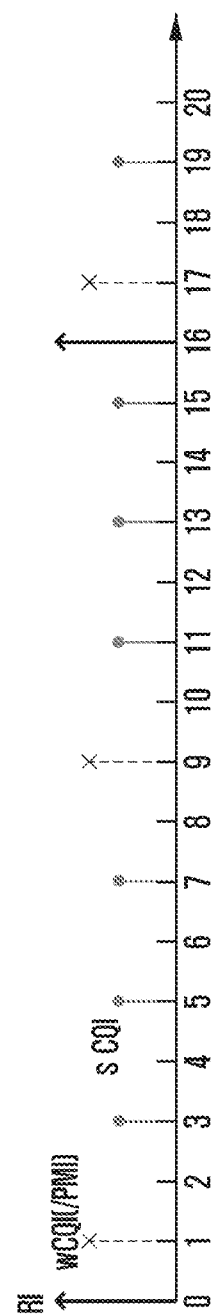
FIG. 4 is a diagram illustrating channel status information feedback timing of a UE according to an embodiment of the present disclosure.

FIG. 4 is a diagram illustrating channel status information feedback timing of a UE according to an embodiment of the present disclosure.

Referring to FIG. 4, the diagram illustrates channel status information feedback timings of RI, sCQI and wCQI in case of $N_{pd}=2$, $M_{RI}=2$, $J=3$ (10 MHz), $K=1$, $N_{OFFSET,CQI}=1$, $N_{OFFSET,RI}=-1$.

The feedback mode 2-1 has the same feedback timing as the mode 2-0, but has a difference that PMI is transmitted together at the wCQI transmission timing.

The above-described feedback timing corresponds to case where the number of CSI-RS antenna ports is four or less, and contrary to the above feedback timing, the UE to which CSI-RS for eight antenna ports is allocated requires feedback of two types of PMI information. As to eight CSI-RS antenna ports, the feedback mode 1-1 is divided into two submodes. In the first submode, RI is transmitted together with the first PMI information, and the second PMI information is transmitted together with wCQI. Here, the period and offset of feedback for wCQI and second PMI are defined as $N_{pd}$ and $N_{OFFSET,CQI}$, and the period and offset of feedback for RI and first PMI are defined as $M_{RI} \cdot N_{pd}$ and $N_{OFFSET,CQI}+N_{OFFSET,RI}$. If precoding matrixes corresponding to the first and second PMIs are denoted as W1 and W2, respectively, the UE and the eNB share information that the UE's preferred precoding matrix is determined as W1W2.

In case of the feedback mode 2-1 for eight CSI-RS antenna ports, feedback of precoding type indicator (PTI) information is added. PTI is fed back together with RI and has a period of $M_{RI} \cdot H \cdot N_{pd}$, and offset is defined as $N_{OFFSET,CQI}+N_{OFFSET,RI}$. If PTI is 0, all of the first PMI, the second PMI and wCQI are fed back, and wCQI and the second PMI are transmitted at the same timing. The period is $N_{pd}$, and the offset is given as $N_{OFFSET,CQI}$. In addition, the period and offset of the first PMI are $H' \cdot N_{pd}$ and $N_{OFFSET,CQI}$, respectively. Here, H' is delivered as a higher layer signal. On the other hand, if PTI is 1, PTI is transmitted together with RI, wCQI and the second PMI are transmitted together, and sCQI is further fed back at a separate timing. In this case, the first PMI is not transmitted. The period and offset of PTI and RI are the same as those in case PTI is 0. The period and offset of sCQI are defined as $N_{pd}$ and $N_{OFFSET,CQI}$, respectively. In addition, wCQI and the second PMI are fed back with the period of $H \cdot N_{pd}$ and the offset of $N_{OFFSET,CQI}$. H is defined as in case the number of CSI-RS antenna ports is four.

Figure 5:
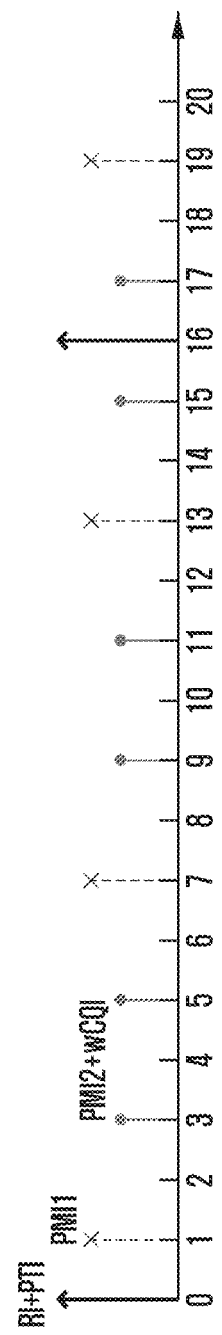
FIG. 5 is a diagram illustrating channel status information feedback timing of a UE according to an embodiment of the present disclosure.
Figure 6:
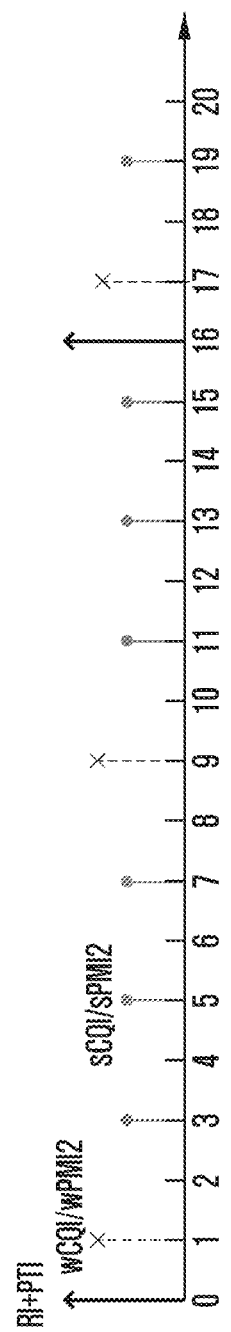
FIG. 6 is a diagram illustrating channel status information feedback timing of a UE according to an embodiment of the present disclosure.

FIGS. 5 and 6 are diagrams illustrating channel status information feedback timing of a UE according to embodiments of the present disclosure.

Referring to FIGS. 5 and 6, the diagrams illustrate channel status information feedback timings of PTI=0 and PTI=1, respectively, in case of $N_{pd}$=2, $M_{RI}$=2, J=3 (10 MHz), K=1, H'=3, $N_{OFFSET,CQI}$=1, and $N_{OFFSET,RI}$=1.

The LTE/LTE-A supports an aperiodic feedback as well as a periodic feedback of the UE. When the eNB desires to obtain aperiodic feedback information of the specific UE, the eNB performs uplink data scheduling of the UE by setting an aperiodic feedback indicator contained in downlink control information (DCI) for uplink data scheduling of the UE to perform a specific aperiodic feedback. When the indicator set to perform the aperiodic feedback is received at the n-th subframe, the UE performs uplink transmission by inserting aperiodic feedback information in data transmission at the (n+k)-th subframe. Here, k which is a parameter defined in the 3GPP LTE Release 11 standard is 4 in FDD (frequency division duplexing) and defined according to UL/DL configuration of the system as shown in Table 1 in time division duplexing (TDD).

TABLE 1

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In case the aperiodic feedback is configured, feedback information includes RI, PMI and CQI as the periodic feedback, and RI and PMI may not be fed back depending on feedback configuration. Additionally, CQI may include both wCQI and sCQI or include wCQI information only.

Table 2 given below indicates a reporting type of a periodic channel status report using physical uplink control channel (PUCCH), information reported according to each relevant reporting type, and a payload size of information used.

TABLE 2

| PUCCH | | | PUCCH Reporting Modes | | | |
|---|---|---|---|---|---|---|
| Reporting Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
|  |  | RI > 1 | NA | 4 + 3 + L | NA | 4 + L |
| 1a | Sub-band CQI/second PMI | 8 ports, RI = 1 | NA | 4 + 4 + L | NA | NA |
|  |  | 8 ports, 1 < RI < 5 | NA | 4 + 2 + 3 + L | NA | NA |
|  |  | 8 ports, RI > 4 | NA | 4 + 3 + L | NA | NA |
| 2 | Wideband CQI/PMI | 2 ports, RI = 1 | 4 + 2 | 4 + 2 | NA | NA |
|  |  | 4 ports, RI = 1 | 4 + 4 | 4 + 4 | NA | NA |
|  |  | 2 ports, RI > 1 | 4 + 1 + 3 | 4 + 1 + 3 | NA | NA |
|  |  | 4 ports, RI > 1 | 4 + 4 + 3 | 4 + 4 + 3 | NA | NA |
| 2a | Wideband first PMI | 8 ports, RI < 3 | NA | 4 | NA | NA |
|  |  | 8 ports, 2 < RI < 8 | NA | 2 | NA | NA |
|  |  | 8 ports, RI = 8 | NA | 0 | NA | NA |
| 2b | Wideband CQI/second PMI | 8 ports, RI = 1 | 4 + 4 | 4 + 4 | NA | NA |
|  |  | 8 ports, 1 < RI < 4 | 4 + 4 + 3 | 4 + 4 + 3 | NA | NA |
|  |  | 8 ports, RI = 4 | 4 + 3 + 3 | 4 + 3 + 3 | NA | NA |
|  |  | 8 ports, RI > 1 | 4 + 3 | 4 + 3 | NA | NA |
| 2c | Wideband CQI/first PMI/ second PMI | 8 ports, RI = 1 | 4 + 4 | NA | NA | NA |
|  |  | 8 ports, 1 < RI ≤ 4 | 4 + 4 + 3 | NA | NA | NA |
|  |  | 8 ports, 4 < RI ≤ 7 | 4 + 2 + 3 | NA | NA | NA |
|  |  | 8 ports, RI = 8 | 4 + 3 | NA | NA | NA |

TABLE 2-continued

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 3 | RI | 2/4 ports, 2-layer SM | 1 | 1 | 1 | 1 |
|  |  | 8 ports, 2-layer SM | 1 | NA | NA | NA |
|  |  | 4 ports, 4-layer SM | 2 | 2 | 2 | 2 |
|  |  | 8 ports, 4-layer SM | 2 | NA | NA | NA |
|  |  | 8-layer SM | 3 | NA | NA | NA |
| 4 | Wideband CQI | RI = 1 or RI > 1 | NA | NA | 4 | 4 |
| 5 | RI/first PMI | 8 ports, 2-layer SM | 4 | NA | NA | NA |
|  |  | 8 ports, 4 and 8 layer SM | 5 |  |  |  |
| 6 | RI/PTI | 8 ports, 2-layer SM | NA | 1 + 1 | NA | NA |
|  |  | 8 ports, 4-layer SM | NA | 2 + 1 | NA | NA |
|  |  | 8 ports, 8-layer SM | NA | 3 + 1 | NA | NA |

As shown in the above Table 2, the UE transmits RI/PTI/PMI/CQI information by using a PUCCH reporting type required for a reporting instance and a PUCCH reporting mode of a periodic channel status report. However, the periodic channel status report of the UE may transmit one PUCCH reporting type only at one report timing by considering the characteristics of report using PUCCH in which allocated resources and transmittable payload size are limited. Therefore, if report timing collides between CSI processes in one cell or if report timing collides between different cells in CA situation, such collision is solved by determining priority according to a PUCCH reporting type. A rule for determining priority is a report period. A longer report period indicates important information having a higher priority. A shorter report period indicates a lower priority. For example, priorities have the order of RI>wideband PMI>wideband CQI>subband PMI and CQI, depending on reporting type. If reports having the same priority collide between different cells, information of a cell having a lower cell index is transmitted to solve such a collision. In addition, in case of no report due to collision, the most recently reported corresponding information is used to continue the remaining periodic channel status report. For example, if wideband PMI information is not reported, and if the most recently reported wideband PMI is 0, the remaining second PMI and CQI information is reported on the assumption that wideband PMI at the current report timing is also 0.

The LTE/LTE-A provides a codebook subsampling function for a periodic channel status report. In the LTE/LTE-A, a periodic feedback of the UE is transmitted to the eNB through PUCCH. Because the amount of information delivered at a time through PUCCH is limited, various feedback objects, such as RI, wCQI, sCQI, PMI1, wideband PMI2 (wPMI2), and subband PMI2 (sPMI2) may be transmitted with PUCCH through subsampling, or two or more kinds of feedback information may be joint-encoded and transmitted with PUCCH. For example, if CSI-RS ports configured by the eNB are 8, RI and PMI1 reported in submode 1 of PUCCH mode 1-1 may be joint-encoded as shown in Table 3 given below. Based on Table 3, RI formed of 3 bits and PMI1 formed of 4 bits are joint-encoded to total 5 bits. As shown in Table 4 given below, submode 2 of PUCCH mode 1-1 joint-encodes PMI1 formed of 4 bits and PMI2 formed of 4 bits to total 4 bits. Because having a greater subsampling level in comparison with submode 1 (4→3 in case of submode 1, 8→4 in case of submode 2), submode 2 cannot report more precoding indexes. In another example, if CSI-RS ports configured by the eNB are 8, PMI2 reported in PUCCH mode 2-1 may be subsampled as shown in Table 5 given below. Referring to Table 5, PMI2 is reported with 4 bits when associated RI is 1. However, if associated RI is 2 or more, PMI2 is subsampled and reported with 2 bits because differential CQI for the second codeword should be additionally reported. In the LTE/LTE-A, it is possible to apply subsampling or joint encoding as to six kinds of periodic feedbacks including Tables 3, 4 and 5.

TABLE 3

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16-17 | 3 | $2(I_{RI/PMI1}-16)$ |
| 18-19 | 4 | $2(I_{RI/PMI1}-18)$ |
| 20-21 | 5 | $2(I_{RI/PMI1}-20)$ |
| 22-23 | 6 | $2(I_{RI/PMI1}-22)$ |
| 24-25 | 7 | $2(I_{RI/PMI1}-24)$ |
| 26 | 8 | 0 |
| 27-31 | reserved | NA |

TABLE 4

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 1 | 0-7 | $2 I_{PMI1}$ | 0-1 | $2I_{PMI2}$ | 4 |
| 2 | 0-7 | $2 I_{PMI1}$ | 0-1 | $I_{PMI2}$ | 4 |
| 3 | 0-1 | $2 I_{PMI1}$ | 0-7 | $4\lfloor I_{PMI2}/4 \rfloor + I_{PMI2}$ | 4 |
| 4 | 0-1 | $2 I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |

TABLE 4-continued

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 7 | 0-3 | $I_{PMI1}$ | 0 | 0 | 2 |
| 8 | 0 | 0 | 0 | 0 | 0 |

TABLE 5

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

There are two techniques for supporting multiple antennas supported in the FD-MIMO, namely, non-precoded (NP) CSI-RS and beamformed (BF) CSI-RS.

Figure 7:
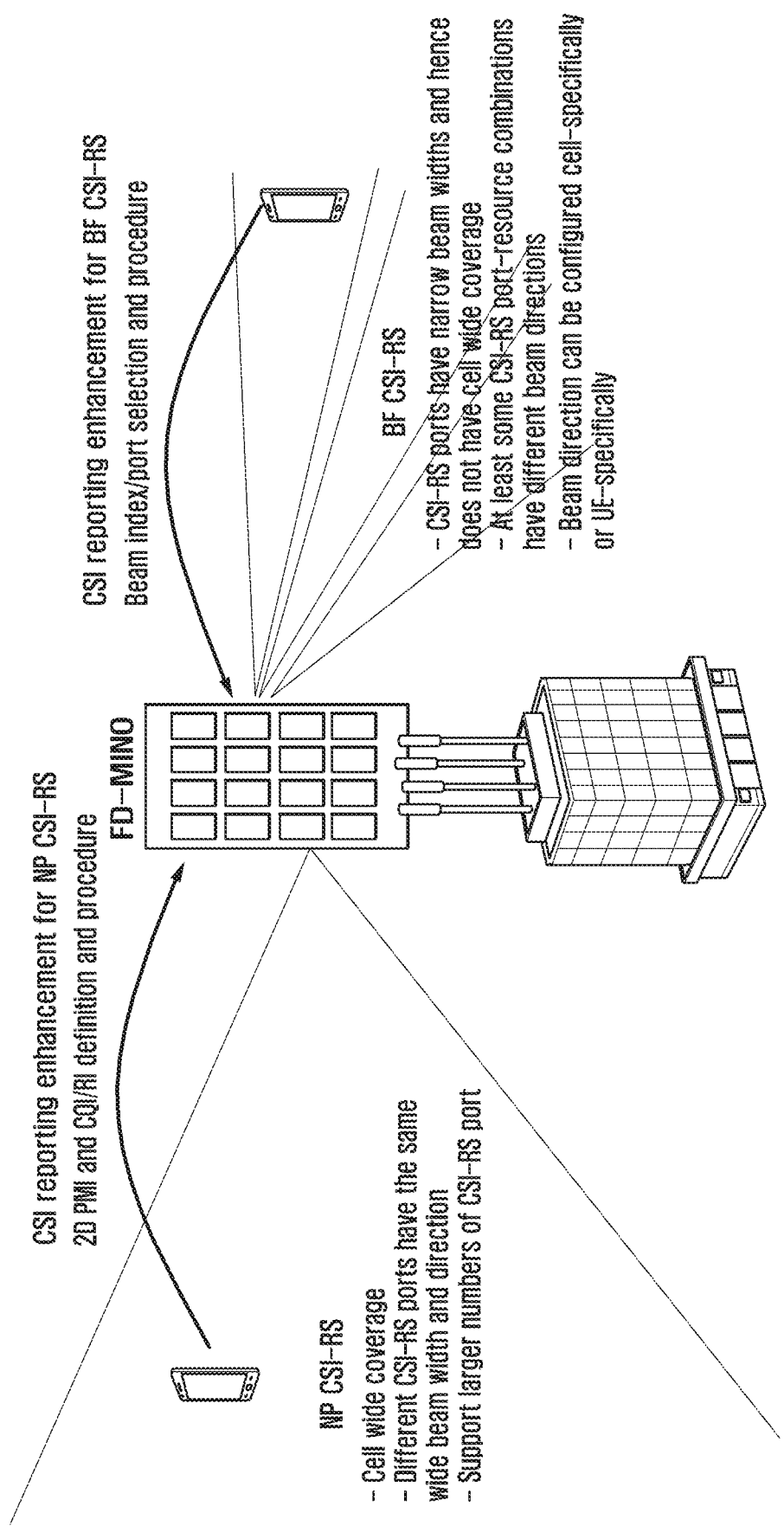
FIG. 7 is a diagram illustrating various utilizable scenarios using beamformed channel status information reference signal (CSI-RS) in FD-MIMO according to an embodiment of the present disclosure.

FIG. 7 is a diagram illustrating various utilizable scenarios using beamformed CSI-RS in FD-MIMO according to an embodiment of the present disclosure.

Referring to FIG. 7, in case of the NP CSI-RS technique, the eNB transmits a CSI-RS having a wide beam width to the UE in the same manner as the existing CSI-RS, and the UE transmits RI/PMI/CQI suitable for a corresponding beam to the eNB. While the existing Rel-11 LTE supports up to 8 CSI-RS ports, a method of supporting various NP CSI-RS ports, such as 12/16/20/24/28/32/64, for an FD-MIMO support and a 2D codebook for a PMI report may be considered.

On the other hand, the BF CSI-RS technique divides the entire beam area with 1D or 2D to optimize the number of codebooks, calculated at one time by the UE, and a CSI-RS overhead. In this case, depending on a method of selecting a 1D or 2D sector required for the UE, the BF CSI-RS technique may be classified into a cell-specific BF CSI-RS technique and a UE-specific BF CSI-RS technique. The cell-specific BF CSI-RS technique transmits a plurality of same beams to UE in view of a cell, selects a beam, based on a channel status report from the UE, and transmits data. In this case, a CSI-RS resource index (CRI) technique or the like may be used for the channel status report. This allows the UE to select and upload information about a preferred beam when there are several CSI-RS resources or CSI-RS ports in one CSI process. While a typical method forces the eNB to receive all of channel status information as to a plurality of CSI processes and then to select a beam, the UE's selection regarding this may save uplink resources and reduce the eNB operation complexity. This CRI is jointly encoded with RI and transmitted, and a corresponding payload size is determined depending on the number of supporting layers of the UE and the maximum number of CSI-RS ports among CSI-RS resources. Table 6 given below shows a CRI/RI payload size.

TABLE 6

| | Bit width | | |
|---|---|---|---|
| Field | Max 2 layers | Max 4 layers | Max 8 layers |
| CRI | $\lceil \log_2(K) \rceil$ | $\lceil \log_2(K) \rceil$ | $\lceil \log_2(K) \rceil$ |
| Rank indication | 1 | 2 | 3 |

A UE's aperiodic channel status report may be transmitted through PUSCH. In this case, RI is transmitted using Reed-Muller (RM) code supporting up to 11 bits. The RM codes supported by LTE are shown in Table 7 given below.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 1 | 0 | 1 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |

TABLE 7-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The UE transmits a 32-bit sequence of an RI payload generated using the above RM codes. As shown in Table 7, RM codes for RI transmission of LTE allows encoding of information bits of up to 11 bits. However, when the number of component carrier (CC) or CSI processes that may be triggered at a time through a single aperiodic channel status trigger is 5, there may be RIs of up to 15 bits. Therefore, in order to meet RI payload that exceeds 11 bits, two RM codes are used for coding up to 22 bits.

The number of control symbols for RI transmission, Q', namely, the number of coded symbols for actually transmitting the block-coded RI payload may be found using parameters, such as the bandwidth scheduled for PUSCH transmission by the eNB and the number of SC-FDMA symbols per subframe as shown in Equation 1.

Therefore, the UE that supports enhanced CA (eCA) uses an RI transmission method using tail biting convolutional codes (TBCCs). However, in case of the UE that does not support this RI transmission using TBCC, the RI bit is limited. In addition, FD-MIMO UE that jointly encodes CRI and RI exceeds the maximum supportable bits, 22 bits, by considering the respective maximum bits, 6 bits (CRI 3 bits, RI 3 bits). Therefore, the UE that does not support RI and CRI transmission through TBCC requires an operation method in case of exceeding 22 bits. Various embodiments of the present disclosure proposes a method for allowing the UE to transmit an aperiodic channel status report by dropping RI/CRI bits required for reporting to 22 bits or less.

Additionally, even in case of supporting the periodic channel status report based on non-precoded CSI-RS (class Equation 1

$$Q' = \min\left(\left\lceil \frac{O \cdot M_{sc}^{PUSCH\text{-}initial} \cdot N_{symb}^{PUSCH\text{-}initial} \cdot \beta_{offset}^{RI}}{\sum_{r=0}^{C-1} K_r} \right\rceil, 4 \cdot M_{sc}^{PUSCH}\right)$$

$Q_{RI} = Q_m \cdot Q'$ = Total number of coded bits for all the encoded RI block Here, O denotes the number of RI bits, $M_{sc}^{PUSCH\text{-}initial}$ denotes a scheduled bandwidth, $N_{symb}^{PUSCH\text{-}initial}$ denotes the number of SC-FDMA symbols of subframe, $\beta_{offset}^{RI}$ denotes a parameter for adjusting a coding rate, and $K_r$ denotes the number of transmitted symbols after codeblock segmentation. Based on the number of RI transmission symbols obtained above, it is designed to transmit the normal CP at OFDM symbols 1, 4, 7 and 10 and the extended CP at symbols 0, 3, 5 and 8. Thereafter, for the part excluding the RI transmission symbol obtained from the above Equation, CQI/PMI and uplink data transmitted together are filled.

Figure 8:
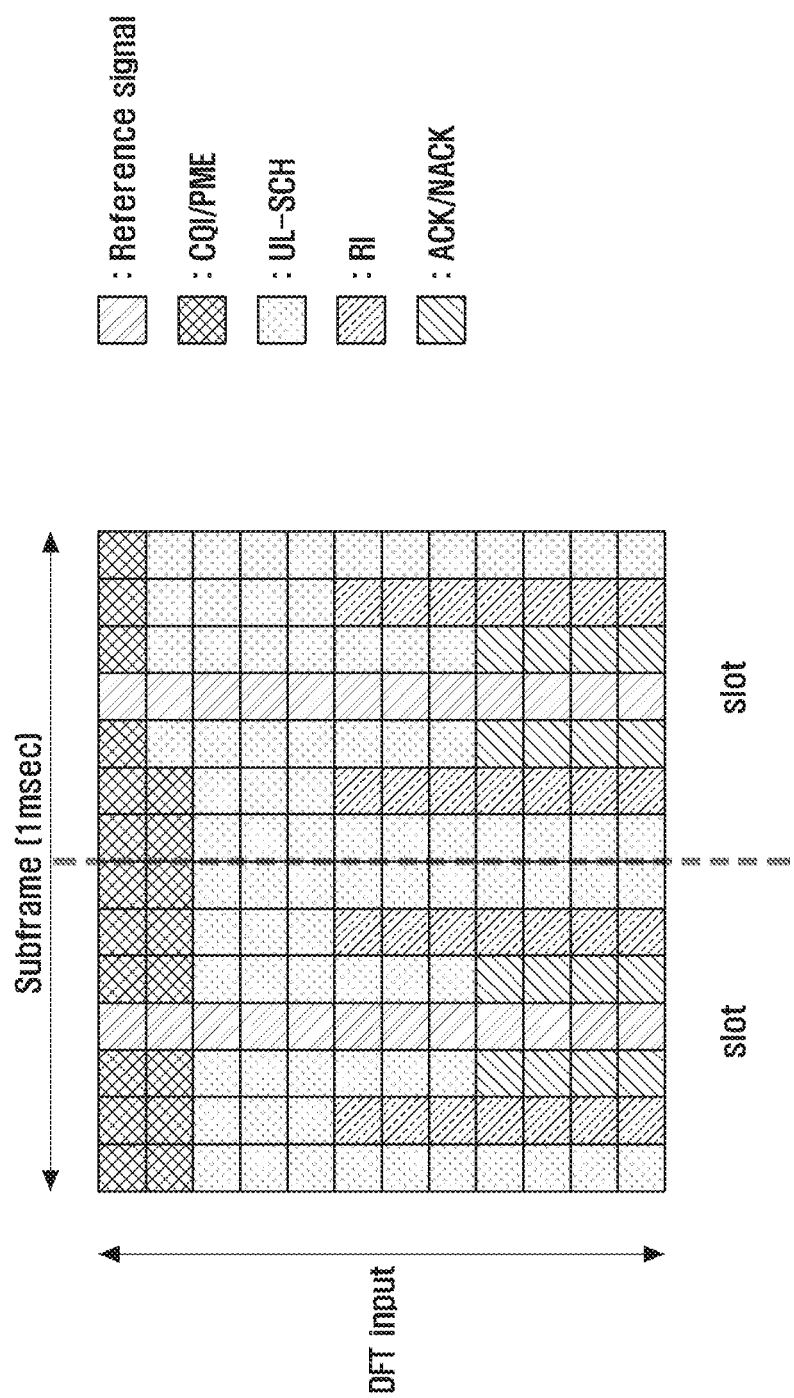
FIG. 8 is a diagram illustrating mapping of rank indicator (RI) to subframe according to an embodiment of the present disclosure.

FIG. 8 is a diagram illustrating mapping of RI information transmission to subframe according to an embodiment of the present disclosure.

Referring to FIG. 8, in the above RI transmission method, RI allows transmission of payloads of 22 bits or less.

A) and beamformed CSI-RS (class B), a collision may occur like RI/PMI/CQI used in the previous periodic channel status report. While this collision is considered based on a PUCCH reporting type, a cell ID, and a CSI process ID, a new priority according to such a CSI reporting type or enhanced MIMO (eMIMO) type is required when supporting new non-precoded CSI-RS and beamformed CSI-RS configuration. Therefore, various embodiments of the present disclosure are to establish a priority in view of such a collision and also address operations when a collision occurs.

First Embodiment

As described above, an embodiment of the present disclosure is for the UE that does not support the existing TBCC and rate matching in transmission of RI and CRI through PUSCH at an aperiodic channel status report. The UE may inform the eNB through the UE capability that the UE does not support the above operation. A corresponding field may be represented through Beyond 5 carrier CA together with other functions supported in eCA, and also represented by a name, such as uplink control information (UCI) on PUSCH or UCI on PUSCH extension together with HARQ-ACK/NACK transmitted using the same TBCC coding.

When CRI reported in the CRI/RI transmission exceeds 22 bits, there are five methods for transmitting CRI/RI using a dual RM code.

CRI/RI transmission method (TM) 1: A method for clearly stating in the standard that relevant configuration is not applied to the UE CRI/RI transmission method 2: A method for not reporting relevant CRI/RI when a related situation occurs CRI/RI transmission method 3: A method for not reporting CRI/RI of some CSI processes when a related situation occurs CRI/RI transmission method 4: A method for not reporting RI of all CSI processes when a related situation occurs CRI/RI transmission method 5: A method for not reporting RI of some CSI processes when a related situation occurs The CRI/RI transmission method 1 proposed by the present disclosure is a method for specifying in the standard that a CRI/RI bit for a relevant report has no configuration exceeding 22 bits. In this case, the operation of the UE may be written in the standard as follows: "UE is not expected to receive configuration for the CSI process with bits for CRI/RI reporting >22." For example, when the CRI/RI bit for a report exceeds 22 bits, the UE may regard this case as an error case. In case of using this method, the UE should solve an issue by implementation thereof when a related situation occurs. One solution may be a way of not reporting channel status information. However, this method, based on the UE implementation, may cause a difference in interpretation on channel status information reporting between the eNB and the UE, thus resulting in delivery of unclear channel status report. One feasible approach of the UE implementation is that the UE ignores such configuration by regarding it as wrong configuration.

The CRI/RI transmission method 2 proposed by the present disclosure is a method for disallowing the UE to report relevant CRI/RI when a related situation occurs. This method is to disallow CRI/RI reporting when the CRI/RI report exceeds 22 bits because of wrong configuration as mentioned with the UE implementation in the CRI/RI transmission method 1. This method has an advantage of the simplest implementation, but has a disadvantage of receiving no information in case of wrong configuration because the eNB cannot obtain and utilize any CRI/RI information. In case of the CRI/RI transmission method 1, there is no predefined solution to wrong configuration in the operation of the UE, so that the UE should solve this by means of implementation. On the contrary, in case of the CRI/RI transmission method 2, it is specified in the standard that the UE does not report channel status information in the related operation.

The CRI/RI transmission method 3 proposed by the present disclosure is a method for disallowing the UE to report CRI/RI of some CSI processes when a related situation occurs. This operation requires priority for determining which CSI process does not perform CRI/RI reporting. A method for determining priority is as follows.

CSI process priority determination method 1 for CRI/RI reporting: Determination in the order of a lower cell ID and a lower CSI process ID CSI process priority determination method 2 for CRI/RI reporting: Determination in the order of a reporting type, a lower cell ID, and a lower CSI process ID CSI process priority determination method 3 for CRI/RI reporting: Determination in the order of a transmission mode, a lower cell ID, and a lower CSI process ID CSI process priority determination method 4 for CRI/RI reporting: Determination in the order of a transmission mode, a reporting type, a lower cell ID, and a lower CSI process ID The CSI process priority determination method 1 is to perform first the CRI/RI reporting of a CC or CSI process having a lower cell ID and then drop the CRI/RI reporting of a CC or CSI process having a higher cell ID when payload exceeds 22 bits. The UE performs dropping until the payload for relevant CRI/RI reporting satisfies 22 bits or less. In this case, if several CSI processes having the same cell ID exist and the payload for CRI/RI reporting still exceeds 22 bits after a CC or CSI process having a higher cell ID is removed, the UE performs first the report of a CSI process having a lower CSI process ID and then drops the report of a CSI process having a higher ID. This method has an advantage that the eNB may receive some CRI/RI information from the UE even when the eNB transmits CRI/RI report configuration exceeding 22 bits to the UE. However, considering that the field configuration of an aperiodic channel status report is made semi-static through radio resource control (RRC), this method has a disadvantage of failing to always receive the CRI/RI report for a relevant CSI process as to a relevant trigger.

The CSI process priority determination method 2 is to drop by considering a CRI reporting type before determination by the CSI process priority determination method 1. Namely, an embodiment of this disclosure may be applied to Hybrid CSI that includes non-precoded CSI-RS (class A) and beamformed CSI-RS (class B). CRI is to select and report one of several CSI-RS resources and requires transmission of more CSI-RS resources in comparison with RI, thus containing more information. Therefore, it is possible to separately determine a CSI process for reporting CRI and RI jointly encoded and a CSI process for reporting only RI without a CRI report. Therefore, if there is a CSI process that does not report CRI among CSI processes triggered by the aperiodic channel status information reporting trigger, RI of the CSI process is removed first. In addition to CRI reporting, depending on whether a relevant CC or CSI-process is non-precoded CSI-RS (class A) that supports higher CSI-RS ports, such as 12 or 16 CSI-RS ports or whether it is a CSI process by cell-specific beamformed CSI-RS (class B with K>1, where K denotes the number of CSI-RS resources configured for the CSI process) that reports CRI even in beamformed CSI-RS (class B) (or whether there are two or more CSI-RS resources), this determination may be performed. In this case, the CSI process that supports non-precoded CSI-RS that reports more information or cell-specific beamformed CSI-RS that reports CRI may have a higher priority than a legacy CSI process that does not support such CSI reporting or the UE-specific beamformed CSI-RS (class B with K=1) with only one CSI-RS resource configured. In this case, non-precoded CSI-RS and cell-specific beamformed CSI-RS reporting CRI may have the same priority. Non-precoded CSI-RS and cell-specific beamformed CSI-RS may be referred to as class A and class B with K>1, respectively, and also referred to as 1st eMIMO-type. In addition, the reporting type may be referred to as eMIMO-type.

If CRI/RI payload for relevant reporting exceeds 22 bits even after this operation, the CSI process priority determination method 1 may be used to perform first the CRI/RI reporting of a CC or CSI process having a lower cell ID and then drop the CRI/RI reporting of a CC or CSI process having a higher cell ID when payload exceeds 22 bits. The UE may perform dropping until the payload for relevant CRI/RI reporting satisfies 22 bits or less. In this case, if several CSI processes having the same cell ID exist and the payload for CRI/RI reporting still exceeds 22 bits after a CC or CSI process having a higher cell ID is removed, the UE may perform first the report of a CSI process having a lower CSI process ID and then drops the report of a CSI process having a higher ID. This method has an advantage that the eNB may receive first CRI information having more information from the UE even when the eNB transmits CRI/RI report configuration exceeding 22 bits to the UE. However, considering that the field configuration of an aperiodic channel status report is made semi-static through RRC, this method has a disadvantage, similarly with the priority determination method 1, of failing to always receive the CRI/RI report for a relevant CSI process as to a relevant trigger.

The CSI process priority determination method 3 is to drop by considering a transmission mode of relevant CC before determination by the CSI process priority determination method 1. A measurement limitation of channel and interference, and a channel status report using the UE-specific CSI-RS, CRI reporting, and 12 and 16 CSI-RS ports supported in the FD-MIMO are only supported in TM 9 and 10. Therefore, determination may depend on whether TM is high or low. In this case, if priority is given to a CC or CSI process having relatively higher TM, the eNB may receive channel status information through a CC or CSI process for supporting more accurate channel status information reporting with higher TM by the UE in the FD-MIMO. In addition, if priority is given to a CC or CSI process having relatively lower TM, the existing macro eNB operates based on lower TM and a small cell operates as FD-MIMO using a new eNB. Therefore, a channel status information report may be based on the above rule such that channel status information about macro may be reported first. If CRI/RI payload for relevant reporting exceeds 22 bits even after the CRI/RI dropping based on TM is finished, the CSI process priority determination method 1 may be used to perform first the CRI/RI reporting of a CC or CSI process having a lower cell ID and then drop the CRI/RI reporting of a CC or CSI process having a higher cell ID when payload exceeds 22 bits. The UE may perform dropping until the payload for relevant CRI/RI reporting satisfies 22 bits or less. In this case, if several CSI processes having the same cell ID exist and the payload for CRI/RI reporting still exceeds 22 bits after a CC or CSI process having a higher cell ID is removed, the UE may perform first the report of a CSI process having a lower CSI process ID and then drops the report of a CSI process having a higher ID. This method has an advantage that the eNB may receive first CRI information having more information from the UE even when the eNB transmits CRI/RI report configuration exceeding 22 bits to the UE. However, considering that the field configuration of an aperiodic channel status report is made semi-static through RRC, this method has a disadvantage, similarly with the priority determination method 1, of failing to always receive the CRI/RI report for a relevant CSI process as to a relevant trigger.

The CSI process priority determination method 4 is to consider all of CSI reporting type and TM of the CSI process priority determination methods 2 and 3. As mentioned above, TM and CSI reporting type have different priorities and may be used together. In this case, whether TM is supportable or not by the FD-MIMO or whether TM is the existing one or not may have priority over the CSI reporting type. As mentioned above in the priority determination method 3, a measurement limitation of channel and interference, and a channel status report using the UE-specific CSI-RS, CRI reporting, and 12 and 16 CSI-RS ports supported in the FD-MIMO are only supported in TM 9 and 10. Therefore, determination may depend on whether TM is high or low. In this case, if priority is given to a CC or CSI process having relatively higher TM, the eNB may receive channel status information through a CC or CSI process for supporting more accurate channel status information reporting with higher TM in the UE in the FD-MIMO. On the contrary, if priority is given to a CC or CSI process having relatively lower TM, the existing macro eNB operates based on lower TM and a small cell operates as FD-MIMO using the new eNB. Therefore, a channel status information report may be based on the above rule such that channel status information about macro may be reported first. After this, a report containing CRI having more information may be reported first. In addition to CRI reporting, depending on whether a relevant CC or CSI-process is a non-precoded CSI-RS (class A) that supports higher CSI-RS ports, such as 12 or 16 CSI-RS ports or whether it is a CSI process by cell-specific beamformed CSI-RS that reports CRI even in beamformed CSI-RS (class B) (or whether there are two or more CSI-RS resources), this determination may be performed. In this case, the CSI process that supports non-precoded CSI-RS that reports more information or cell-specific beamformed CSI-RS that reports CRI may have a higher priority than a legacy CSI process that does not support such CSI reporting or the UE-specific beamformed CSI-RS with only one CSI-RS resource configured. In this case, non-precoded CSI-RS and cell-specific beamformed CSI-RS reporting CRI may have the same priority. In case priority is given to the CSI reporting type, information having no CRI report is excluded. Therefore, when lower TM and higher TM are mixed, the lower TM is not required because it is preferentially excluded according to the CSI reporting type basis. Thereafter, the drop may be determined based on a lower cell ID and a lower CSI process ID as described in the priority determination methods 1-3.

The CRI/RI transmission method 4 proposed by the present disclosure is a method for disallowing the UE to report RI of all CSI processes when a related situation occurs. As mentioned above, CRI selects and reports one of several CSI-RS resources and requires transmission of more CSI-RS resources than RI, thus containing more information. Therefore, to allow CRI to be reported in more CSI processes, CRI only may be reported in all CSI processes when a relevant payload exceeds 22 bits at CRI/RI reporting. In this case, the UE may maximally transmit 22 CRIs when CRI is 1 bit, maximally transmit 11 CRIs when CRI is 2 bits, and maximally transmit 7 CRIs for CC or CSI processes when CRI is 3 bits. The above method may transmit and receive as many CRIs having more information as compared with the RI. However, considering that the field configuration of an aperiodic channel status report is made semi-static through RRC, this method has a disadvantage of failing to always receive the RI report for all CC or CSI processes as to a relevant trigger.

The CRI/RI transmission method 5 proposed by the present disclosure is a method for disallowing the UE to report RI of some CSI processes when a related situation occurs. As mentioned above, CRI selects and reports one of several CSI-RS resources and requires transmission of more CSI-RS resources than RI, thus containing more information. Therefore, to allow CRI to be reported in more CSI processes, CRI only may be reported in some CC or CSI processes when a relevant payload exceeds 22 bits at CRI/RI reporting. Depending on a difference in payload of CRI/RI, as mentioned in the CRI/RI transmission method 4, the UE may maximally transmit 22 CRIs when CRI is 1 bit, maximally transmit 11 CRIs when CRI is 2 bits, and maximally transmit 7 CRIs for CC or CSI processes when CRI is 3 bits. However, while the transmission method 4 always transmits CRI only even though transmittable payload remains, this method has an advantage that it may be used more effectively since it does not transmit RI in some CC or CSI processes depending on the amount of payload of CRI/RI. Because of transmitting no RI in some CC or CSI processes, the CRI/RI transmission method 5 needs a priority for determining which CC or CSI process does not perform RI transmission. At this time, the priority mentioned in the CRI/RI transmission method 3 may be reused as follows.

CSI process priority determination method 1 for CRI/RI reporting: Determination in the order of a lower cell ID and a lower CSI process ID CSI process priority determination method 2 for CRI/RI reporting: Determination in the order of a reporting type, a lower cell ID, and a lower CSI process ID CSI process priority determination method 3 for CRI/RI reporting: Determination in the order of a transmission mode, a lower cell ID, and a lower CSI process ID CSI process priority determination method 4 for CRI/RI reporting: Determination in the order of a transmission mode, a reporting type, a lower cell ID, and a lower CSI process ID The above method may transmit as many CRIs having more information as compared with RI and thus has good utilization of information. However, because the UE has to determine a relevant situation and then drop some information according to priority, the complexity of the UE operation may increase relatively. In addition, considering that the field configuration of an aperiodic channel status report is made semi-static through RRC, this method has a disadvantage of failing to always receive the RI report for some CC or CSI processes as to a relevant trigger. Meanwhile, if the size of payload for CRI transmission exceeds 22 bits even after removing RI in all CC or CSI processes by performing the CRI/RI transmission method 5, the CRI/RI transmission method 3 may be further performed to further determine CRI of which CC or CSI process is to be dropped according to priority.

In the above CRI/RI transmission methods 1 to 5, it is described that CRI/RI or RI only is dropped. However, because CQI/PMI information should assume certain specific CRI/RI only when there is no CRI/RI information, effectiveness may be degraded. Therefore, such CQI/PMI information may also not be transmitted.

In addition, if CQI/PMI information is transmitted for a CC or CSI process with CRI/RI or RI dropped in the CRI/RI transmission methods 1 to 5, the corresponding CRI and RI may be the most recently reported CRI and RI to the eNB. If there is no recently reported information, CRI may be the lowest CSI and RI may be the lowest RI unlimited by the codebook subset restriction.

In addition, in the CRI/RI transmission methods 1 to 5, if CRI transmitted for a CC or CSI process with RI dropped is different from CRI previously reported for a relevant CSI process by the UE, RI for CQI/PMI information may be the lowest RI unlimited by the codebook subset restriction rather than the most recently reported RI.

Figure 9:
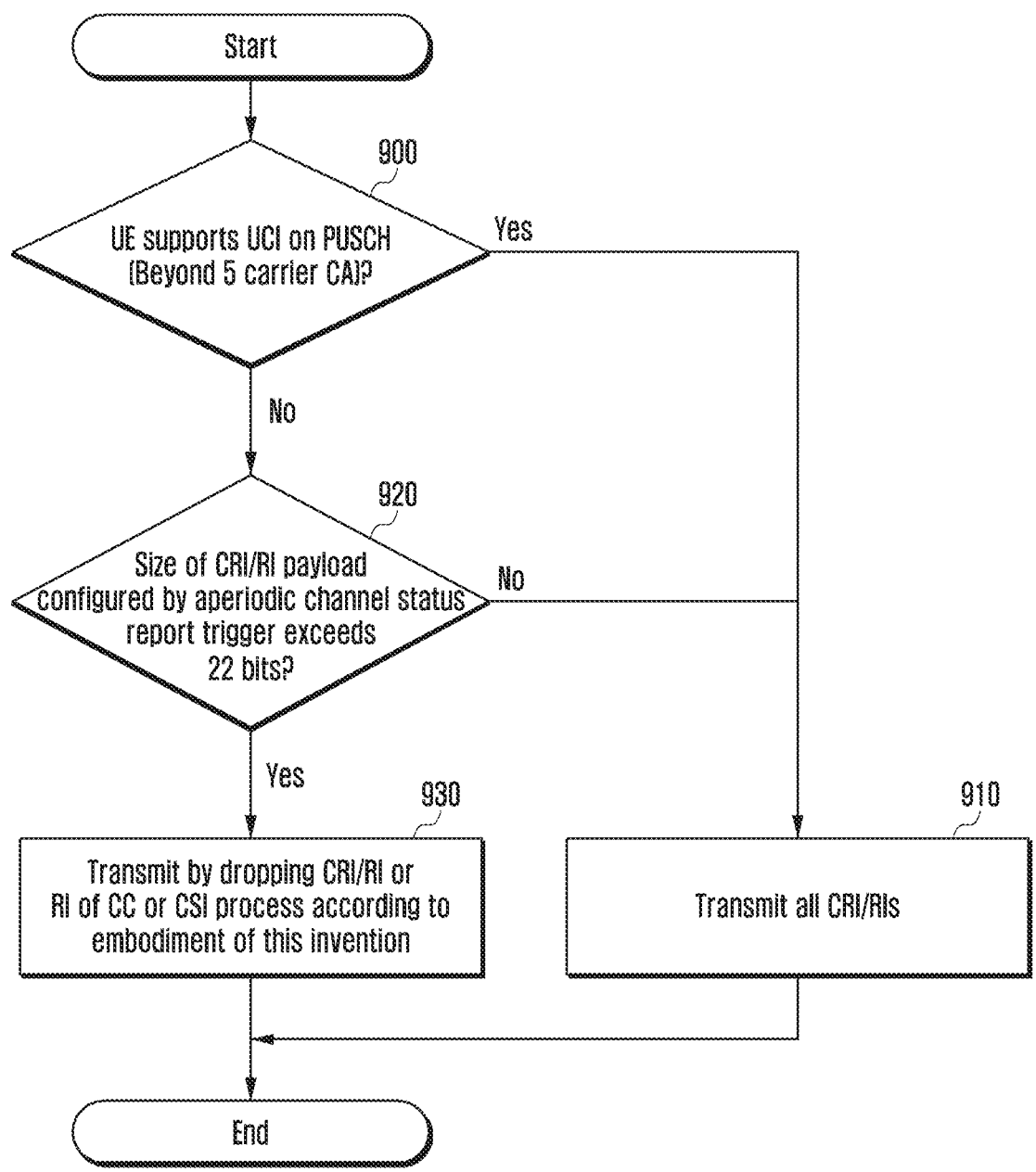
FIG. 9 is a flow diagram illustrating operations of a UE according to an embodiment of the present disclosure.

FIG. 9 is a flow diagram illustrating operations of a UE according to an embodiment of the present disclosure.

Referring to FIG. 9, at operation 900, the UE may determine whether RI and CRI transmission using TBCC is supported. This may be written as UCI on PUSCH, UCI on PUSCH extension, or Beyond 5 carrier CA in the UE capability field. When the UE supports the CRI/RI transmission using TBCC, the UE may transmit all CRI/RI information at operation 910.

If the UE does not support the CRI/RI transmission using TBCC, the UE may determine at operation 920 whether the size of payload required for a CRI/RI report of CC (cell) or CSI processes triggered in an aperiodic channel status report triggered to the UE by the eNB exceeds 22 bits. If the payload size does not exceed 22 bits, the UE may transmit at operation 910 all CRI/RI information by using a dual RM code. If the payload size exceeds 22 bits, the UE may transmit at operation 930 payload adjusted not to exceed 22 bits by dropping CRI/RI or RI of all or some CC or CSI processes according to the above-discussed embodiment of the present disclosure. In this case, the above-discussed methods may be used for determining whether to transmit CQI/PMI and for CRI/RI assumption. In FIG. 9, although the UE capability determination is performed before the determination whether there is an excess over 22 bits, the order of such determination operations may be changed. In other words, it is first determined whether the payload size exceeds 22 bits, and then it is determined whether the UE supports CRI/RI transmission using TBCC.

Figure 10:
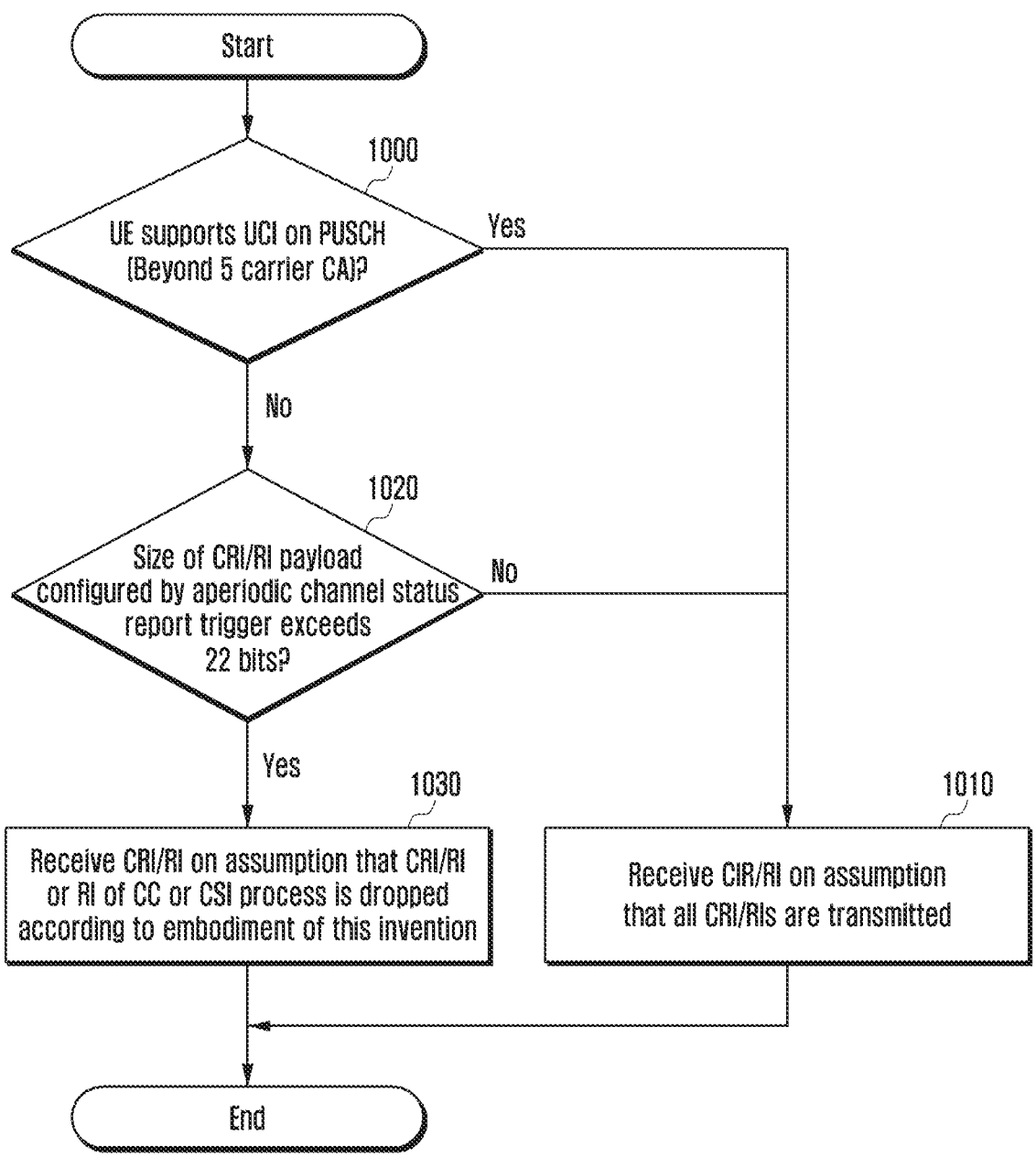
FIG. 10 is a flow diagram illustrating operations of an evolved nodeB (eNB) according to an embodiment of the present disclosure.

FIG. 10 is a flow diagram illustrating operations of an eNB according to an embodiment of the present disclosure.

Referring to FIG. 10, at operation 1000, the eNB may determine whether the UE to which the eNB triggers an aperiodic channel status report supports RI and CRI transmission using TBCC. This may be written as UCI on PUSCH, UCI on PUSCH extension, or Beyond 5 carrier CA in the UE capability field. If the UE supports the CRI/RI transmission using TBCC, the eNB may receive CRI/RI at operation 1010 on the assumption that all CRI/RI information is transmitted.

If the UE does not support the CRI/RI transmission using TBCC, the eNB may determine at operation 1020 whether the size of payload required for a CRI/RI report of CC (cell) or CSI processes triggered in the aperiodic channel status report triggered to the UE by the eNB exceeds 22 bits. If the payload size does not exceed 22 bits, the eNB may receive at operation 1010 all CRI/RI information on the assumption that it is transmitted using a dual RM code. If the payload size exceeds 22 bits, the eNB may receive at operation 1030 payload on the assumption that the UE transmits payload adjusted not to exceed 22 bits by dropping CRI/RI or RI of all or some CC or CSI processes according to the above-discussed embodiment of the present disclosure. In this case, the above-discussed methods may be used for determining whether to transmit CQI/PMI and for CRI/RI assumption. In FIG. 10, although the UE capability determination is performed before the determination whether there is an excess over 22 bits, the order of such determination operations may be changed. In other words, it is first determined whether the payload size exceeds 22 bits, and then it is determined whether the UE supports CRI/RI transmission using TBCC.

Second Embodiment

As mentioned above, even in case of supporting this periodic channel status report based on non-precoded CSI-RS (class A) and beamformed CSI-RS (class B), a collision may occur like RI/PMI/CQI used in the previous periodic channel status report. While this collision is previously considered based on a PUCCH reporting type, a lower cell ID, and a lower CSI process ID, a new priority according to such a CSI reporting type (or referred to as eMIMO type) is required when supporting new non-precoded CSI-RS and beamformed CSI-RS configuration. Therefore, an embodiment of this disclosure proposes a priority in consideration for such a collision.

As previously discussed, a non-precoded CSI-RS (class A) may support 12/16/20/24/32/64 CSI-RS ports or the like. Therefore, the eNB may transmit more CSI-RSs by using more REs and, through this, obtain more exact information. In addition, for cell-specific beamformed CSI-RS (class B with K>1, where K denotes the number of CSI-RS resources configured for the CSI process) resources, the UE may report an index of a preferred CSI-RS resource among a plurality of CSI-RS resources through CRI and then transmit RI/PMI/CQI of a relevant resource. On the other hand, in case of the UE-specific CSI-RS, it is determined that the eNB already has information about a channel of the UE. Therefore, smaller resources are required for CSI-RS transmission in comparison with other case of non-precoded and cell-specific CSI-RS. In case of the UE-specific CSI-RS (class B with K=1), PMI transmitted by the UE may be a codebook that indicates how to combine the UE-specific beams transmitted by the eNB, and also the UE transmits corresponding RI/CQI. It is therefore identified that the non-precoded and cell-specific CSI-RSs need more CSI-RS resources in comparison with the UE-specific beamformed CSI-RS and thus feedback information contains more detailed information. Considering this resource consumption and the amount of information, when the periodic channel status report of the UE-specific beamformed CSI-RS requiring relatively smaller resources and information collides with the periodic channel status report of non-precoded and cell-specific beamformed CSI-RS, it is needed to preferentially transmit information of the non-precoded and cell-specific beamformed CSI-RS. A method for supporting priority is as follows.

Priority setting method 1 according to CSI reporting type in periodic channel status report: Setting of priority in the order of non-precoded CSI-RS=cell-specific beamformed CSI-RS>UE-specific CSI-RS Priority setting method 2 according to CSI reporting type in periodic channel status report: Setting of priority in the order of non-precoded CSI-RS>cell-specific beamformed CSI-RS>UE-specific CSI-RS Priority setting method 1 according to CSI reporting type in periodic channel status report: Setting of priority in the order of cell-specific beamformed CSI-RS>non-precoded CSI-RS>UE-specific CSI-RS Priority setting method 1 according to CSI reporting type in periodic channel status report: Priorities of cell-specific beamformed CSI-RS and non-precoded CSI-RS are set with RRC or the number of ports and then priority of the UE-specific CSI-RS is set.

In case of the priority setting method 1, the non-precoded CSI-RS and the cell-specific beamformed CSI-RS are set to have the same priority, and the priority of the UE-specific CSI-RS is set. According to the result of FD-MIMO SI (study item) performed in 3GPP, the non-precoded CSI-RS has higher performance than that of the cell-specific beamformed CSI-RS in case of 32 CSI-RS ports (or transceiver units (TXRU)) or less, but the beamformed CSI-RS port has higher performance in case of 64 CSI-RS ports. Therefore, because two CSI reporting types (or eMIMO types) cannot be assured which has higher information, two types are transmitted at the same priority and then periodic channel status information of the UE-specific CSI-RS may be transmitted.

In case of the priority setting method 2, after preceding the non-precoded CSI-RS, priorities are set in the order of the cell-specific beamformed CSI-RS and the UE-specific CSI-RS. As mentioned above, the non-precoded CSI-RS has higher performance than that of the cell-specific beamformed CSI-RS in case of 32 CSI-RS ports (or TXRU) or less. Therefore, because the non-precoded CSI-RS may have higher efficiency than that of the cell-specific beamformed CSI-RS in 32 CSI-RS ports or less, it is advantageous to preferentially transmit information of non-precoded. Therefore, in case of using this method, the performance of 32 CSI-RS ports or less may be optimized, but the performance may be lowered in case of more CSI-RS ports.

In case of the priority setting method 3, after preceding the cell-specific beamformed CSI-RS, priorities are set in the order of the non-precoded CSI-RS and the UE-specific CSI-RS. As mentioned above, the cell-specific beamformed CSI-RS has higher performance than that of the non-precoded CSI-RS in case of 64 CSI-RS ports (or TXRU) or more. Therefore, because the cell-specific beamformed CSI-RS may have higher efficiency than that of the non-precoded CSI-RS in 64 CSI-RS ports or more, it is advantageous to preferentially transmit information of cell-specific beamformed CSI-RS. Therefore, in case of using this method, the performance of 64 CSI-RS ports or more may be optimized, but the performance may be lowered in case of less CSI-RS ports.

In case of the priority setting method 4, priorities of cell-specific beamformed CSI-RS and non-precoded CSI-RS may be set with RRC or determined on a condition, such as the number of all CSI-RS ports established in the cell-specific beamformed CSI-RS. As mentioned above, the non-precoded CSI-RS has higher performance than that of the cell-specific beamformed CSI-RS in case of 32 CSI-RS ports (or TXRU) or less, but the beamformed CSI-RS port has higher performance in case of 64 CSI-RS ports. Therefore, because two CSI reporting types (or eMIMO types) cannot be assured which has higher information, it may be configured for the eNB to preferentially transmit the optimal CSI reporting type depending on a situation of the eNB when two types may be set with RRC. Another method is based on the number of CSI-RS resources established in a CSI process or the number of all CSI-RS ports. In case of supporting higher TXRU in the cell-specific beamformed CSI-RS, more beams are required. Therefore, determination may be based on the number of much more CSI-RS resources or the number of all CSI-RS ports. In case of CSI-RS resources, it may be determined as a numeral, such as two or more, three or more, and the like. In case of the number of all CSI-RS ports, it may be determined as the sum of CSI-RS ports established in the relevant CSI process, such as 32 ports or more, 64 ports or more, and the like. In addition, the priority setting method 4 may be applied to the same non-precoded CSI-RS, cell-specific beamformed CSI-RS or UE-specific CSI-RS type. In addition, when a collision occurs between 12 and 15 port CSI-RSs in the non-precoded CSI-RS, when the number of CSI-RS resources established between the cell-specific beamformed CSI-RSs or the number of all CSI-RS ports is different, or when the number of CSI-RS ports established in the UE-specific beamformed CSI-RS is different, the drop may be determined based on this determination.

Although the above description is focused on the CSI reporting type, this disclosure may use in parallel the previous PUCCH reporting type, cell ID, CSI process ID, and the like. For example, after determining whether to drop the report by means of the previous PUCCH reporting type (CRI/RI/PMI/CQI, and the like), and when the final determination is not made through this, the determination is made first using the priority setting method by a CSI reporting type according to this embodiment. Thereafter, the priority may be further determined using a lower cell ID and a lower CSI process ID. In another example, after determining whether to drop by means of priority based on a CSI reporting type according to this embodiment, the determination may be further made using the previous PUCCH reporting type, cell ID and CSI process ID.

Figure 11:
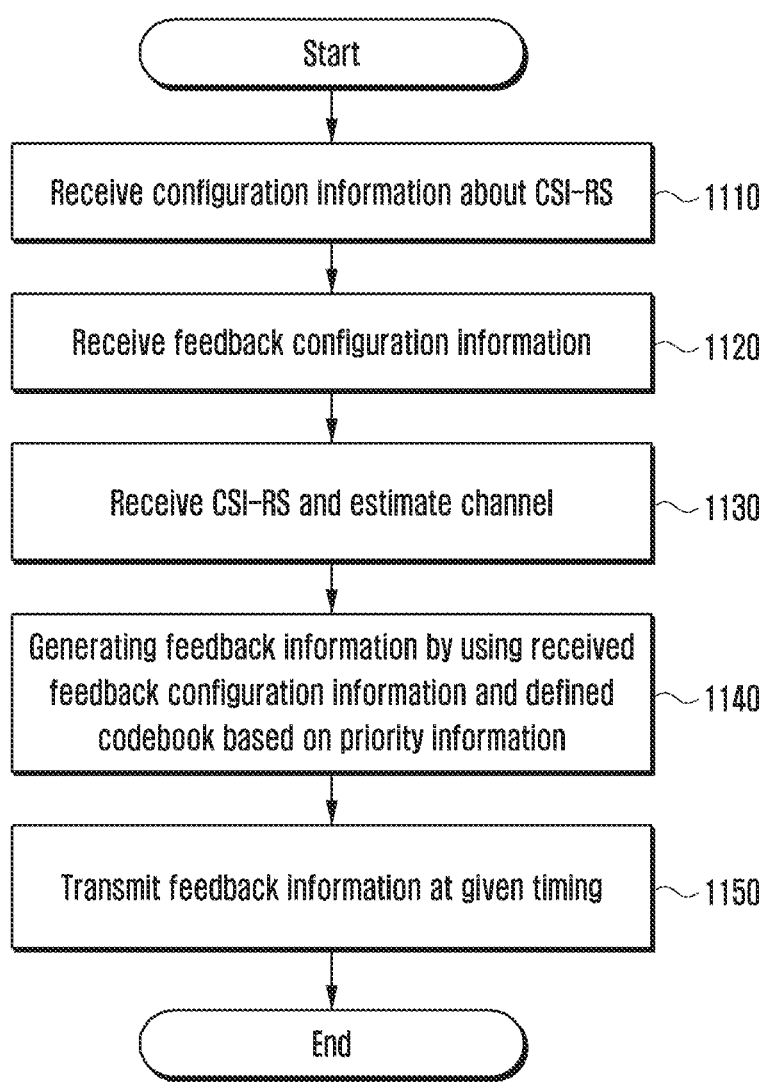
FIG. 11 is a flow diagram illustrating operations of a UE up to channel status reporting after configuring a CSI-RS and a channel status information report according to an embodiment of the present disclosure.

FIG. 11 is a flow diagram illustrating an operation flow of a UE according to an embodiment of the present disclosure.

Referring to FIG. 11, at operation 1110, the UE may receive configuration information about CSI-RS. In addition, based on the received configuration information, the UE may determine at least one of the number of ports for each NP CSI-RS, N1 and N2 each of which is the number of antennas for each dimension, O1 and O2 each of which is an oversampling factor for each dimension, one subframe configuration for transmitting several CSI-RSs, a plurality of resource configuration for setting a location, codebook subset restriction related information, CSI report related information, CSI-process index, and transmission power information. The configuration information about CSI-RS may include configuration information about non-precoded CSI-RS, cell-specific beamformed CSI-RS, and UE-specific beamformed CSI-RS.

Thereafter, at operation 1120, the UE configures feedback configuration information based on at least one of 2, 4, 8, 12, 16, 20, 24, 32, 64-port CSI-RS locations. In this information, PMI/CQI period and offset, RI period and offset, wideband or subband, submode, and the like, for a periodic channel status report may be configured, and at this time RRC configuration may be included. In addition, a plurality of bitmaps for an aperiodic channel status report may be configured. In this case, the bitmap is configuration for indicating which CSI process or CC is triggered by a relevant aperiodic channel status report trigger. Depending on the UE, up to 5 or 32 CSI processes or CCs may be supported. The feedback configuration information may include feedback configuration information about non-precoded CSI-RS, cell-specific beamformed CSI-RS, and the UE-specific beamformed CSI-RS.

At operation 1130, if a lot of CSI-RSs are received in one subframe based on relevant information, the UE measures a channel between an eNB antenna and a receiving antenna of the UE. The UE may perform channel measurement by receiving at least one of non-precoded CSI-RS, cell-specific beamformed CSI-RS, and the UE-specific beamformed CSI-RS, depending on configuration.

At operation 1140, based on the measured channel and a virtual channel added between CSI-RSs, the UE may generate feedback information, CRI, RI, PMI, and CQI, by using the received feedback configuration.

At this time, based on the feedback configuration information, the UE may determine whether resources for transmitting feedback information as to non-precoded CSI-RS, cell-specific beamformed CSI-RS, and the UE-specific beamformed CSI-RS are overlapped. If it is determined that at least two kinds of feedback information are transmitted on the same resources, the UE may not generate feedback information having a lower priority, based on priorities according to the above-discussed CSI reporting type. Alternatively, after generation, transmission may be skipped.

At this time, the assumption and method proposed in this disclosure may be used for generating such CRI, RI, PMI, CQI, and the like.

Thereafter, at operation 1150, the UE may transmit the feedback information to the eNB at a feedback timing determined according to the feedback configuration of the eNB.

Figure 12:
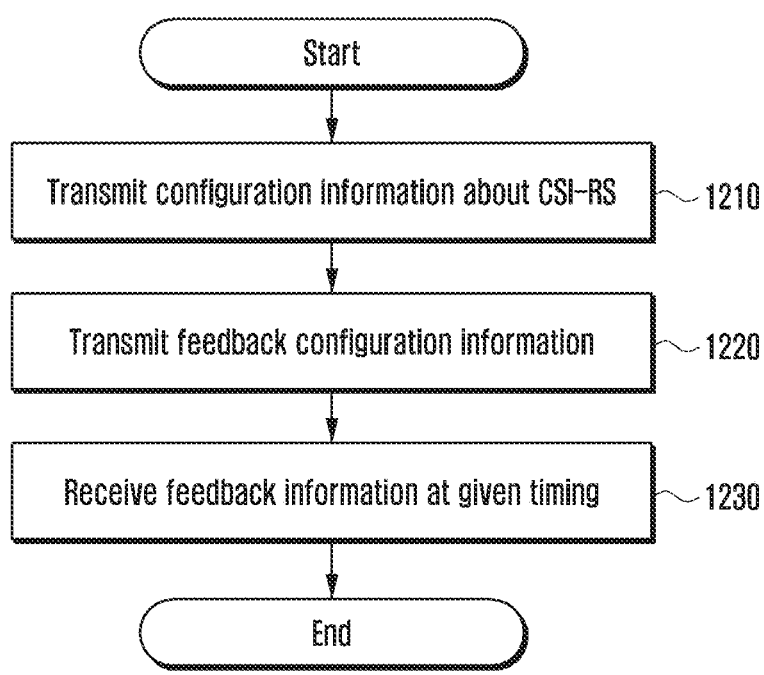
FIG. 12 is a flow diagram illustrating operations of an eNB up to channel status reporting after configuring a CSI-RS and a channel status information report according to an embodiment of the present disclosure.

FIG. 12 is a flow diagram illustrating an operation flow of an eNB according to an embodiment of the present disclosure.

Referring to FIG. 12, at operation 1210, the eNB may transmit configuration information about a CSI-RS for measuring a channel to the UE. The configuration information may include at least one of the number of ports for each NP CSI-RS, N1 and N2 each of which is the number of antennas for each dimension, O1 and O2 each of which is an oversampling factor for each dimension, one subframe configuration for transmitting several CSI-RSs, a plurality of resource configuration for setting a location, codebook subset restriction related information, CSI report related information, CSI-process index, and transmission power information. The configuration information about CSI-RS may include configuration information about non-precoded CSI-RS, cell-specific beamformed CSI-RS, and the UE-specific beamformed CSI-RS.

Thereafter, at operation 1220, the eNB may transmit feedback configuration information based on the at least one CSI-RS to the UE. In this information, PMI/CQI period and offset, RI period and offset, wideband or subband, submode, and the like, for a periodic channel status report may be configured, and at this time RRC configuration may be included. In addition, a plurality of bitmaps for an aperiodic channel status report may be configured. The feedback configuration information may include feedback configuration information about non-precoded CSI-RS, cell-specific beamformed CSI-RS, and the UE-specific beamformed CSI-RS.

The eNB transmits the configured CSI-RS to the UE. The UE measures a channel for each antenna port. Based on this, the UE determines the feedback, generates corresponding CRI, PMI, RI, and CQI, and transmits them to the eNB. In this case, CRI, PMI, RI, and CQI may be assumed and generated, based on embodiments proposed in this disclosure. As discussed above, the UE may give the priority to the feedback information, based on the CSI reporting type, and drop the feedback information having a lower priority. At operation 1230, the eNB may receive the feedback information from the UE at the determined timing and then utilize it to determine a channel status between the UE and the eNB.

Figure 13:
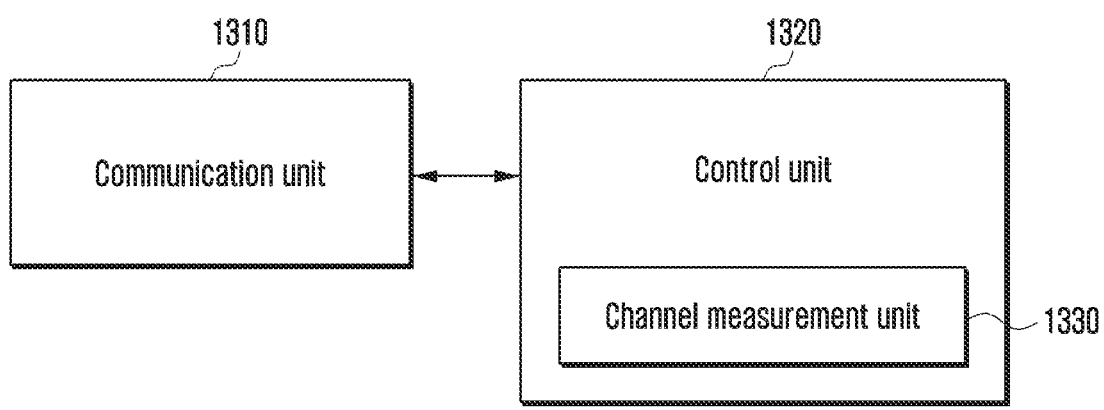
FIG. 13 is a block diagram illustrating a structure of a UE according to an embodiment of the present disclosure.

FIG. 13 is a block diagram illustrating a structure of a UE according to an embodiment of the present disclosure.

Referring to FIG. 13, the UE includes a communication unit 1310 and a control unit 1320. The communication unit 1310 may include at least one RF module, and the control unit 1320 may include at least one processor.

The communication unit 1310 performs a function of transmitting or receiving data to or from an external entity (for example, the eNB). The communication unit 1310 may transmit feedback information to the eNB under the control of the control unit 1320.

The control unit 1320 controls states and operations of all elements of the UE. Specifically, the control unit 1320 generates feedback information according to information allocated from the eNB. In addition, the control unit 1320 controls the communication unit 1310 to feedback generated channel information to the eNB according to timing information allocated from the eNB.

For this, the control unit 1320 may include a channel measurement unit 1330. The channel measurement unit 1330 determines necessary feedback configuration information through CSI-RS and feedback allocation information received from the eNB, and measures a channel by using the received CSI-RS based on the feedback configuration information. In addition, based on DCI transmitted by the eNB, the UE decodes PDSCH by applying reference signal mapping that applies a precoder to a DMRS port, a size and rank of a physical resource block group (PRG) corresponding to PDSCH transmission described in embodiments of this disclosure.

Although FIG. 13 shows that the UE is configured as the communication unit 1310 and the control unit 1320, the present disclosure is not limited to this. The UE may further include various elements depending on functions thereof. For example, the UE may further include a display unit for displaying a current status of the UE, an input unit for receiving a user's input for performing a function, a memory unit for storing data generated in the UE. Although the channel measurement unit 1330 is illustrated as being contained in the control unit 1320, the present disclosure is not limited to this. The control unit 1320 may control the communication unit 1310 to receive configuration information as to each of the at least one reference signal resource from the eNB. In addition, the control unit 1320 may measure the at least one reference signal and control the communication unit 1310 to receive, from the eNB, feedback configuration information for generating feedback information according to the measurement result.

Additionally, the control unit 1320 may measure at least one reference signal received through the communication unit 1310 and generate feedback information according to the feedback configuration information. In addition, the control unit 1320 may control the communication unit 1310 to transmit the generated feedback information to the eNB at the feedback timing according to the feedback configuration information. In addition, the control unit 1320 may receive CSI-RS from the eNB, generate feedback information based on the received CSI-RS, and transmit the generated feedback information to the eNB. In this case, the control unit 1320 may select a precoding matrix for each antenna port group of the eNB and further select one additional precoding matrix based on a relation between the antenna port groups of the eNB.

Additionally, the control unit 1320 may receive CSI-RS from the eNB, generate feedback information based on the received CSI-RS, and transmit the generated feedback information to the eNB. In this case, the control unit 1320 may select one precoding matrix for all antenna port groups of the eNB. In addition, the control unit 1320 may receive feedback configuration information from the eNB, receive CSI-RS from the eNB, generate feedback information based on the received feedback configuration information and the received CSI-RS, and transmit the generated feedback information to the eNB. In this case, the control unit 1320 may receive additional feedback configuration information based on the feedback configuration information corresponding to each antenna port group of the eNB and a relation between the antenna port groups.

According to an embodiment of this disclosure, based on the feedback configuration information, the control unit 1320 may determine whether resources to which feedback information about non-precoded CSI-RS, cell-specific beamformed CSI-RS, and the UE-specific beamformed CSI-RS is allocated are overlapped. If at least two resources are overlapped, the control unit 1320 may not generate and/or transmit feedback information having a lower priority, based on priorities according to the above-discussed CSI reporting type.

Figure 14:
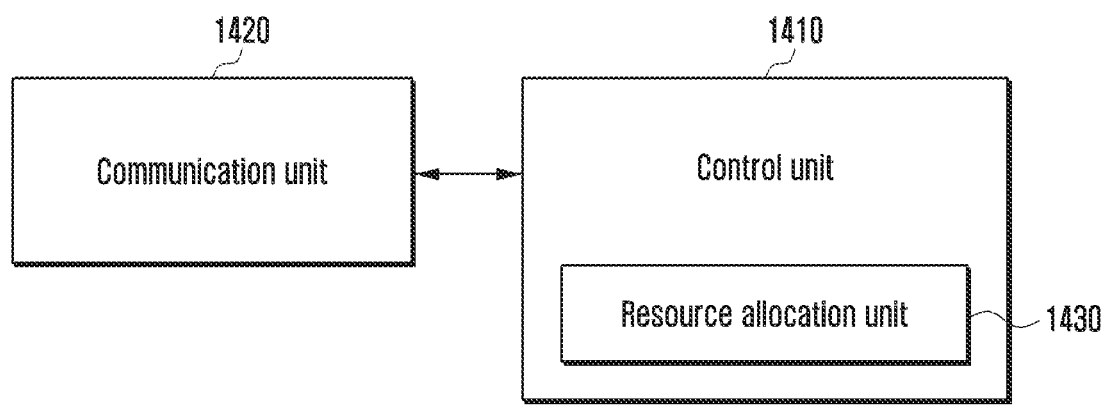
FIG. 14 is a block diagram illustrating a structure of an eNB according to an embodiment of the present disclosure.

FIG. 14 is a block diagram illustrating a structure of an eNB according to an embodiment of the present disclosure.

Referring to FIG. 14, the eNB includes a control unit 1410 and a communication unit 1420. The communication unit 1420 may include at least one RF module, and the control unit 1410 may include at least one processor.

The control unit 1410 controls states and operation of all elements of the eNB. Specifically, the control unit 1410 allocates CSI-RS resources for channel estimation of the UE to the UE and allocates feedback resources and feedback timing to the UE. For this, the control unit 1410 may further include a resource allocation unit 1430. In addition, the control unit allocates feedback configuration and feedback timing so that the feedback from the UEs does not collide, then receives and analyzes feedback information at the corresponding timing. The communication unit 1420 performs a function of transmitting and receiving data, a reference signal, and feedback information to and from the UE. The communication unit 1420 transmits CSI-RS to the UE through allocated resources under the control of the control unit 1410, and receives feedback regarding channel information from the UE. In addition, the eNB maps and transmits a reference signal in which a precoder is applied to the corresponding DMRS port according to an embodiment of this disclosure, based on rank, some PMI information, CQI, and the like obtained from channel status information transmitted by the UE.

Although the resource allocation unit 1430 is illustrated as being contained in the control unit 1410, this disclosure is not limited to this. The control unit 1410 may control the communication unit 1420 to transmit configuration information for each of the at least one reference signal to the UE, or may generate the at least one reference signal. In addition, the control unit 1410 may control the communication unit 1420 to transmit feedback configuration information for generating feedback information according to the measurement result to the UE. In addition, the control unit 1410 may control the communication unit 1420 to transmit the at least one reference signal to the UE and receive feedback information transmitted from the UE at a feedback timing according to the feedback configuration information. In addition, the control unit 1410 may transmit feedback configuration information to the UE, transmit CSI-RS to the UE, and receive, from the UE, the feedback information generated based on the feedback configuration information and the CSI-RS.

In this case, the control unit 1410 may transmit additional feedback configuration information based on a relation between antenna port groups and feedback configuration information corresponding to each antenna port group of the eNB. Further, the control unit 1410 may transmit beamformed CSI-RS based on feedback information to the UE, and receive feedback information generated based on the CSI-RS from the UE.

According to embodiments of the present disclosure described above, it is possible to prevent the eNB having an array structure of many two-dimensional antennas from allocating excessive feedback resources in transmitting CSI-RS and also prevent an increase in channel estimation complexity. In addition, the UE may effectively measure all channels as to many transmitting antennas, form measurement results as feedback information, and notify the feedback information to the eNB.

According to various embodiments, at least some of the devices (for example, modules or functions thereof) or the method (for example, operations) according to the present disclosure may be implemented by a command stored in a computer-readable storage medium in a programming module form. When the instruction is performed by at least one processor (for example, the processor), the at least one processor may perform a function corresponding to the instruction. The computer-readable storage medium may be, for example, the memory. At least some of the programming modules may be implemented (for example, executed) by, for example, the processor. At least some of the programming modules may include, for example, a module, a program, a routine, a set of instructions or a process for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving configuration information on a plurality of channel status information reference signals (CSI-RSs);
   receiving the plurality of the CSI-RSs based on the configuration information;
   determining whether a first resource to transmit a first CSI report associated with a first CSI-RS and a second resource to transmit a second CSI resource associated with a second CSI-RS overlap based on the configuration information;
   determining a priority associated with the first CSI report and the second CSI report, in case that the first resource to transmit the first CSI report and the second resource to transmit the second CSI resource overlap;
   dropping a first CSI report having a lower priority; and
   transmitting a second CSI report having a higher priority, wherein the priority is determined based on a CSI report type, a serving cell index, and a CSI report configuration identification.

2. The method of claim 1, wherein the configuration information includes resource configuration information of the first resource to transmit the first CSI report and the second resource to transmit the second CSI resource, and resource information for the plurality of CSI-RSs.

3. The method of claim 1, wherein the second CSI report comprises at least one of a rank indicator (RI), a precoding matrix indicator (PMI), a channel quality indicator (CQI) and a CSI-RS resource index (CRI).

4. The method of claim 1, wherein the CSI report type is associated with a non-precoded CSI-RS, a cell-specific beamformed CSI-RS and a UE-specific beamformed CSI-RS.

5. The method of claim 4, wherein the second CSI report associated with the non-precoded CSI-RS and the cell-specific beamformed CSI-RS having the higher priority is generated and the first CSI report associated with the UE-specific beamformed CSI-RS having lower priority is not generated.

6. The method of claim 4, wherein the non-precoded CSI-RS and the cell-specific beamformed CSI-RS have the higher priority than the UE-specific beamformed CSI-RS.

7. The method of claim 1, the configuration information is received by a radio resource control (RRC) message.

8. A terminal in a wireless communication system, the terminal comprising:
   a transceiver configured to transmit and receive signals; and
   at least one processor configured to:
      receive, via the transceiver, configuration information on a plurality of channel status information reference signals (CSI-RSs), receive, via the transceiver, the plurality of the CSI-RSs based on the configuration information, determine whether a first resource to transmit a first CSI report associated with a first CSI-RS and a second resource to transmit a second CSI resource associated with a second CSI-RS overlap based on the configuration information, determine a priority associated with the first CSI report and the second CSI report, in case that the first resource to transmit the first CSI report and the second resource to transmit the second CSI resource overlap, drop a first CSI report having a lower priority, and transmit, via the transceiver, a second CSI report having a higher priority, wherein the priority is determined based on a CSI report type, a serving cell index, and a CSI report configuration identification.

9. The terminal of claim 8, wherein the configuration information includes resource configuration information of the first resource to transmit the first CSI report and the second resource to transmit the second CSI resource, and resource information for the plurality of CSI-RSs.

10. The terminal of claim 8, wherein the second CSI report comprises at least one of a rank indicator (RI), a precoding matrix indicator (PMI), a channel quality indicator (CQI) and a CSI-RS resource index (CRI).

11. The terminal of claim 8, wherein the CSI report type is associated with a non-precoded CSI-RS, a cell-specific beamformed CSI-RS and a UE-specific beamformed CSI-RS.

12. The terminal of claim 11, wherein the second CSI report associated with the non-precoded CSI-RS and the cell-specific beamformed CSI-RS having the higher priority is generated and the first CSI report associated with the UE-specific beamformed CSI-RS having lower priority is not generated.

13. The terminal of claim 11, wherein the non-precoded CSI-RS and the cell-specific beamformed CSI-RS have the higher priority than the UE-specific beamformed CSI-RS.

14. The terminal of claim 8, the configuration information is received by a radio resource control (RRC) message.

* * * * *